United States Patent
Jain et al.

(10) Patent No.: US 12,413,535 B1
(45) Date of Patent: *Sep. 9, 2025

(54) EFFICIENT SCHEDULING USING ADAPTIVE PACKING MECHANISM FOR NETWORK APPARATUSES

(71) Applicant: Innovium, Inc., Santa Clara, CA (US)

(72) Inventors: Ajit Kumar Jain, Milpitas, CA (US); Ashwin Alapati, San Jose, CA (US)

(73) Assignee: Innovium, Inc., Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/385,342

(22) Filed: Oct. 30, 2023

Related U.S. Application Data

(63) Continuation of application No. 17/141,130, filed on Jan. 4, 2021, now Pat. No. 11,805,066.

(51) Int. Cl.
| | | |
|---|---|---|
| *H04L 47/62* | (2022.01) | |
| *H04L 45/00* | (2022.01) | |
| *H04L 47/52* | (2022.01) | |
| *H04L 49/90* | (2022.01) | |

(52) U.S. Cl.
CPC .......... *H04L 47/6225* (2013.01); *H04L 45/68* (2013.01); *H04L 47/521* (2013.01); *H04L 47/6215* (2013.01); *H04L 49/90* (2013.01)

(58) Field of Classification Search
CPC .............. H04L 47/6225; H04L 47/6215; H04L 47/521; H04L 45/68; H04L 49/90
See application file for complete search history.

(56) References Cited

U.S. PATENT DOCUMENTS

| | | | | |
|---|---|---|---|---|
| 8,588,242 | B1 * | 11/2013 | Izenberg | H04L 47/527 710/52 |
| 11,805,066 | B1 * | 10/2023 | Jain | H04L 45/68 |
| 2006/0187949 | A1 * | 8/2006 | Seshan | H04L 49/901 370/229 |

OTHER PUBLICATIONS

United States Patent and Trademark Office, U.S. Appl. No. 17/141,130, Non-Final Office Action dated Feb. 17, 2023.
United States Patent and Trademark Office, U.S. Appl. No. 17/141,130, Notice of Allowance dated Jun. 12, 2023.

* cited by examiner

*Primary Examiner* — Siming Liu
(74) *Attorney, Agent, or Firm* — Shield Intellectual Property PC; Kirk D. Wong

(57) ABSTRACT

A scheduler in a network device serves ports with data units from a plurality of queues. The scheduler implements a scheduling algorithm that is normally constrained to releasing data to a port no more frequently than at a default maximum service rate. However, when data units smaller than a certain size are at the heads of one or more data unit queues assigned to a port, the scheduler may temporarily increase the maximum service rate of that port. The increased service rate permits fuller realization of a port's maximum bandwidth when handling smaller data units. In some embodiments, increasing the service rate involves dequeuing more than one small data unit at a time, with the extra data units temporarily stored in a port FIFO. The scheduler adds a pseudo-port to its scheduling sequence to schedule release of data from the port FIFO, with otherwise minimal impact on the scheduling logic.

20 Claims, 12 Drawing Sheets

EFFICIENT SCHEDULING USING ADAPTIVE PACKING MECHANISM FOR NETWORK APPARATUSES

TECHNICAL FIELD

Embodiments relate generally to computer networking, and, more specifically, to techniques for improving a network device's throughput via enhancements to its scheduler(s).

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

A computer network is a set of computing components interconnected by communication links. Each computing component may be a separate computing device, such as, without limitation, a hub, switch, bridge, router, server, gateway, or personal computer, or a component thereof. Each computing component, or "network device," is considered to be a node within the network. A communication link is a mechanism of connecting at least two nodes such that each node may transmit data to and receive data from the other node. Such data may be transmitted in the form of signals over transmission media such as, without limitation, electrical cables, optical cables, or wireless media.

The structure and transmission of data between nodes is governed by a number of different protocols. There may be multiple layers of protocols, typically beginning with a lowest layer, such as a "physical" layer that governs the transmission and reception of raw bit streams as signals over a transmission medium. Each layer defines a data unit (the protocol data unit, or "PDU"), with multiple data units at one layer typically combining to form a single data unit in another. Additional examples of layers may include, for instance, a data link layer in which bits defined by a physical layer are combined to form a frame or cell, a network layer in which frames or cells defined by the data link layer are combined to form a packet, and a transport layer in which packets defined by the network layer are combined to form a TCP segment or UDP datagram. The Open Systems Interconnection model of communications describes these and other layers of communications. However, other models defining other ways of layering information may also be used. The Internet protocol suite, or "TCP/IP stack," is one example of a common group of protocols that may be used together over multiple layers to communicate information. However, techniques described herein may have application to other protocols outside of the TCP/IP stack.

A given node in a network may not necessarily have a link to each other node in the network, particularly in more complex networks. For example, in wired networks, each node may only have a limited number of physical ports into which cables may be plugged in to create links. Certain "terminal" nodes—often servers or end-user devices—may only have one or a handful of ports. Other nodes, such as switches, hubs, or routers, may have a great deal more ports, and typically are used to relay information between the terminal nodes. The arrangement of nodes and links in a network is said to be the topology of the network, and is typically visualized as a network graph or tree.

A given node in the network may communicate with another node in the network by sending data units along one or more different paths through the network that lead to the other node, each path including any number of intermediate nodes. The transmission of data across a computing network typically involves sending units of data, such as packets, cells, or frames, along paths through intermediary networking devices, such as switches or routers, that direct or redirect each data unit towards a corresponding destination.

While a data unit is passing through an intermediary networking device—a period of time that is conceptualized as a "visit" or "hop"—the device may perform any of a variety of actions, or processing steps, with the data unit. The exact set of actions taken will depend on a variety of characteristics of the data unit, such as metadata found in the header of the data unit, and in many cases the context or state of the network device. For example, address information specified by or otherwise associated with the data unit, such as a source address, a destination address, or path information, is typically used to determine how to handle a data unit (e.g. what actions to take with respect to the data unit). For instance, an Internet Protocol ("IP") data packet may include a destination IP address field within the header of the IP data packet, based upon which a network device may determine one or more other networking devices, among a number of possible other networking devices, to forward the IP data packet to. The logic within a network device that controls the specific set of actions performed with respect to a given data unit is often referred to as "packet-switching" or "forwarding" logic.

A network device may include any number of internal hardware and/or software components configured to handle the movement of data units between processing components within the device and, eventually, out of the device. It is desirable for these components to quickly determine where to send and/or store data for processing, and to expediently send and/or store that data to the appropriate destination once determined. Moreover, it is desirable for these components to handle network traffic in a manner that will optimally utilize available network resources throughout the network in which the device is situated.

BRIEF DESCRIPTION OF THE DRAWINGS

The present inventive subject matter is illustrated by way of example, and not by way of limitation, in the figures of the accompanying drawings and in which like reference numerals refer to similar elements and in which.

DETAILED DESCRIPTION

Figure 1:
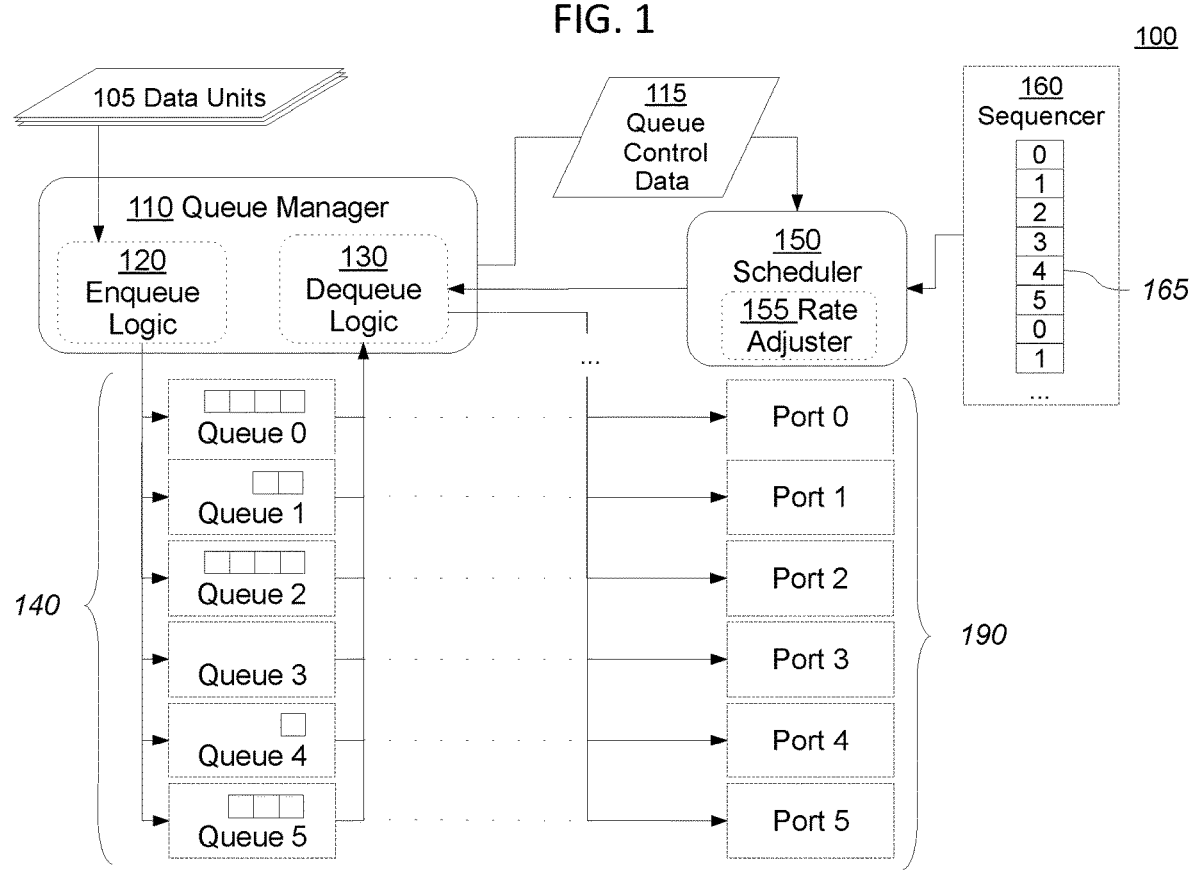
FIG. 1 is an illustrative view of various components of an example scheduler-based subsystem for queueing data units while those data units await transmission to downstream logic within a network device comprising a plurality of ports.

In the following description, for the purposes of explanation, numerous specific details are set forth in order to provide a thorough understanding of the present inventive subject matter. It will be apparent, however, that the present inventive subject matter may be practiced without these specific details. In other instances, well-known structures and devices are shown in block diagram form in order to avoid unnecessarily obscuring the present inventive subject matter.

Embodiments are described herein according to the following outline:

1.0 General Overview
2.0. System Overview
  2.1. Data Units
  2.2. Ports
  2.3. Queue Manager
  2.4. Scheduler
  2.5. Port FIFOs and Pseudo-Ports
  2.6. Example Port FIFO Implementation for Single Port
  2.7. Example Port FIFO Operation
  2.8. Miscellaneous
3.0. Functional Overview
  3.1. Enqueuing a Data Unit
  3.2. Scheduling Dequeue Operations
  3.3. Increasing Service Rate for Small Data Units
  3.4. Dequeuing a Normal Port Coupled to a Port FIFO
  3.5. Dequeuing a Pseudo Port for a Port FIFO
4.0. Example Embodiments
5.0. Example Network Device
  5.1. Networks
  5.2. Network Device
  5.3. Ports
  5.4. Packet Processors
  5.5. Buffers
  5.6. Queues
  5.7. Traffic Management
  5.8. Forwarding Logic
  5.9. Multi-Pipeline Architecture
  5.10. Miscellaneous
6.0. Implementation Mechanism—Hardware Overview
7.0. Extensions and Alternatives 1.0. General Overview Approaches, techniques, and mechanisms are disclosed for improving performance of switches or other network devices by increasing the efficiency with which a scheduler serves a plurality of ports with data units from a plurality of queues. The scheduler implements a scheduling algorithm that is normally constrained to scheduling the release of data to a port no more frequently than at a default maximum service rate (e.g. once every two clock cycles, once every four clock cycles, etc.). However, when data units smaller than a certain size are at the heads of one or more queues of data units assigned to a port, the scheduler may temporarily increase the maximum service rate of that port. The maximum service rate may return to its default value, for instance, when a data unit larger than the certain size returns to the head of the queue.

Among other advantages, the improved scheduler permits fuller realization of a port's maximum bandwidth when handling smaller packets or other data units. For example, a scheduler dealing with a stream of 64 byte packets destined for certain port on a device running at a certain clock speed might have to provide a new packet to the port at a frequency greater than every other clock cycle. This would mean the scheduler would have to be capable of scheduling packets for dispatch to the port on back-to-back clock cycles at least some of the time to realize the full capacity of the port. However, it is typically not desirable for a scheduler to do so. Serving a port at high frequencies adds technical complexity, such as requiring extremely fast updating and communication of control information concerning the availability of data for the port to the scheduler (potentially prohibitively so). Moreover, permitting a scheduler to serve a port at high frequencies may aggravate burst behavior within the device. That is, if data units are very large instead of very small, the scheduler may end up sending more data downstream than can be handled at the port (or another downstream component), meaning that the downstream component would either have to drop data units and/or that the downstream component may send instructions upstream to stop transmitting to the port for a time. Such an instruction is typically undesirable, as it may cause upstream components to pause transmission for longer than necessary, result in dropped data units, and/or have other detrimental effects.

Hence, according to an embodiment, the scheduler is permitted to service a port more frequently (e.g. back-to-back) only when serving data units smaller than a certain size, and reverts to a less frequent maximum service rate when serving data units larger than that size. The size may vary depending on the embodiment as well as the context. For instance, in an embodiment, the data units are transport data units ("TDU") that are typically of a fixed maximum size. Any data unit smaller than the fixed maximum size may activate the scheduler's ability to serve data units more frequently. In an embodiment, the scheduler's behavior is activated only when transmitting data units that are considered to be end-of-packet ("EOP") data units followed by start-of-packet ("SOP") data units of less than a certain size. In an embodiment, a data unit must also be small enough to be transmitted on a bus of a fixed size concurrently with the previous or next data unit to be transmitted to the port. For instance, if the bus size is 512 bytes, and a first data unit is 256 bytes in size, if the next data unit is no greater than 256 bytes in size, then the scheduler's ability to serve data units more frequently may be activated.

According to an embodiment, the ability to schedule a port for service more frequently than the default maximum service rate is enabled by the introduction of a combination of features. These features include rate adjustment logic configured to recognize when multiple data units are ready to be dequeued, dequeue logic capable of dequeuing these multiple data units simultaneously, transmission logic configured to send the first of these multiple data units downstream while holding the other(s) temporarily in a first-infirst-out buffer for the port (referred to herein as the "port FIFO"), and logic at the scheduler that associates the port FIFO with a pseudo-port that, when scheduled, causes a data unit to be released from the FIFO. Among other advantages, such a combination may, in some embodiments, require minimal changes to the scheduler and/or other components of a network device compared to certain alternative implementations.

According to an embodiment, the foregoing techniques may be implemented on a port-by-port basis. For example, a device manufacturer may advertise certain ports as having the ability to increase service rates for small packets, whereas other ports might not. If a higher service rate is enabled by means of a port FIFO, a port FIFO may be provided for some ports, but, to reduce expense, not for others. For instance, it may be desirable to include port FIFOs to permit higher service rates for high speed ports (e.g. 400 Gb/s, 800 Gb/s, etc.), but not for lower speed ports (e.g. 100 Gb/s). In an embodiment, the foregoing functionality may be enabled programmatically by a user or device manufacturer.

2.0. System Overview

FIG. 1 is an illustrative view of various components of an example scheduler-based subsystem 100 for queueing data units while those data units await transmission to downstream logic within a network device comprising a plurality of ports 190, according to an embodiment. Subsystem 100 may be a subsystem within a switch or other network device, as described elsewhere herein, or any other computing device. In an embodiment, the various components of subsystem 100 described below are hardware-based logic units within one or more application-specific integrated circuits (ASICs), field programmable gate arrays (FPGAs), or other integrated circuit(s). In other embodiments, some or all of the components may be software-based logic implemented by one or more processors executing instructions stored in one or more computer-readable media.

Subsystem 100 may be utilized in any component of a device that needs to queue data destined for or otherwise associated with different ports 190 (or other constructs). For instance, subsystem 100 may be utilized in a network device to manage the flow of data units through queues within a traffic manager or ingress arbiter to downstream logic such as egress ports, egress processors, ingress processors, etc. The example components of subsystem 100 depicted in FIG. 1 are now described.

2.1. Data Units

Data is communicated to and from subsystem 100 as series of discrete units referred to as data units 105. Data units 105 may be any type of data unit. In an embodiment, a data unit 105 is a set of data no larger than a fixed maximum size (e.g. a fixed number of bits or bytes) for transmission and/or storage purposes within a device. This fixed maximum size may correspond to, for instance, the width(s) of certain busses or interconnects within the device that implements subsystem 100, the maximum amount of data that may be processed by certain components within the device at a time, the maximum size of a row or entry in a buffer that stores each data unit 105, and/or other constraints.

In an embodiment, each data unit 105 is a portion of a larger data unit. To differentiate between these two types of data units, the larger data units may be referred to as Protocol Data Units ("PDUs") while data units 105 may be referred to as Transport Data Units ("TDUs"). Some PDUs may be of a significantly larger size than a TDU. For instance, a PDU may be divided into tens, hundreds, or even greater numbers of constituent TDUs. However, smaller PDUs may also exist, including PDUs that are smaller than the fixed maximum size of a TDU, and are thus referred to as single-TDU PDUs.

A PDU may have been divided into TDUs at some point prior to arrival at subsystem 100, such as by ingress logic upon receipt of the PDU at the implementing device, or even by another device that sent the PDU. TDUs may be accompanied by metadata, such as an internal header or sideband control information, that identifies the PDU to which the TDU belongs. TDUs belonging to the same PDU are linked together, and will typically arrive at and depart from the subsystem 100 in their order within the PDU. The first TDU within a PDU is known as the start-of-PDU or start-of-packet ("SOP") TDU, while the last TDU within the PDU is known as the end-of-PDU or end-of-packet ("EOP") TDU. All TDUs between the SOP and EOP are referred to as middle-of-packet ("MOP") TDUs. In an embodiment, all TDUs except for EOP TDUs are of the same fixed maximum size. In an embodiment, a SOP TDU that is also an EOP TDU (that is, a single-TDU PDU), may be referred to as an SEOP TDU.

In an embodiment, each PDU is an Internet Protocol ("IP") packet, while each TDU is a cell or frame of an IP packet. However, in other embodiments, PDUs and TDUs may conform to other structures, such as segments, datagrams, messages, etc. In yet other embodiments, each data unit 105 may instead be a PDU.

Data units 105 may be stored temporarily in a buffer (not depicted). They may have been written to the buffer by any suitable component of the implementing device. For instance, the data units 105 may have been received by a traffic manager, ingress arbiter, or other component with limited resources for handling data units 105. Such a component may have placed a data unit 105 in the buffer until it is ready to process and/or transmit the data unit 105. In some embodiments, a TDU may itself be subdivided into Storage Data Units ("SDUs") for storage purposes within the buffer, but is combined back together for transmission purposes.

2.2. Ports

Each data unit 105 is to be transmitted to one or more ports 190. Depending on where subsystem 100 is deployed within an implementing device, subsystem 100 may transmit a data unit 105 directly to a port 190, or subsystem 100 may transmit a data unit to downstream logic comprising one or more components that further processes the data unit 105 and then forward the data unit 105 to its destination port(s) 190. In the former case, subsystem 100 may thus have separate egress paths for each port 190, while in the latter case, subsystem 100 may or may not have separate egress paths for each port 190, depending on the configuration of the downstream logic.

Metadata associated with a data unit 105 (e.g. header information, control information, etc.) indicates the port(s) 190 to which a data unit 105 is to be transmitted. In an embodiment, such metadata may have been generated by the implementing device in response to analyzing the data unit 105, or other data units 105 belonging to the same PDU. For instance, forwarding logic within the implementing device may have analyzed the SOP TDU of a PDU upon arrival at the implementing device. By comparing destination address(es) and/or other header information within the SOP TDU to forwarding instructions within a forwarding table, the forwarding logic may have identified one or more ports 190 to send the PDU to. The forwarding logic may have generated control information for the PDU that identifies these port(s) 190, and then linked this control information to each TDU in the PDU (e.g. by inserting it into each TDU, prepending each TDU with the control information, linking each TDU with a PDU identifier that in turn is linked to the control information, etc.).

2.3. Queue Manager

Subsystem 100 includes a queue manager 110 that maintains queues 140 of data units 105 that are ready for transmission to ports 190. A queue 140 is a sequence of zero or more of the data units 105, which indicates an order for processing those data units 105. The first data unit 105 in the sequence is said to be at the "head" of the queue 140, while the last data unit 105 is said to be at the tail. When the first data unit 105 is ready to be processed, it is dequeued, or "popped," from the queue 140, and the next data unit 105 in the sequence becomes the head. In this manner, a data unit 105 moves from the tail of the queue 140 to the head of the queue 140 over time, and is eventually dequeued.

The size of a queue 140 will vary over time. In an embodiment, there may be a maximum queue size. A queue 140 may be described by linking data, such as a linked list of data unit identifying information, an array of data unit identifying information, or any other suitable structure. In yet other embodiments, a queue 140 may be a distinct portion of a buffer in which its constituent data units 105 are stored in the corresponding sequence.

ENQUEUE LOGIC

Queue manager 110 includes enqueue logic 120 configured to receive a data unit 105, or information identifying a data unit 105, from upstream logic within the implementing device. In the former case, if a data unit 105 is received directly by enqueue logic 120, queue manager 110 may interact with buffer management logic to store the data unit 105 in a suitable location. In the latter case, the information may be, for instance, metadata for the data unit 105, an identifier by which such metadata may be located, the location of the data unit 105 within a buffer, or any other suitable identifying information.

The enqueue logic 120 resolves an incoming data unit 105 to one or more of the queues 140 based on the destination port 190 of the data unit 105 and/or other suitable metadata. Enqueue logic 120 then attempts to enqueue the incoming data unit 105 within the resolved queue(s) 140, meaning that the incoming data unit 105 is placed at the tail, or end, of the queue 140. In some embodiments, enqueue logic 120 may be unable to enqueue a data unit 105 on account of the queue 140 being too large, having an unacceptable amount of delay, and/or other constraints, in which case the data unit 105 may be dropped instead of enqueued.

In an embodiment, each queue 140 is assigned to a single port. The enqueue logic 120 will only enqueue a data unit 105 within a queue 140 assigned to a port 190 to which the data unit 105 is to be sent. As depicted, each port 190 is assigned to a single queue 140. However, in other embodiments, there may be more than one queue 140 associated with some or all of the ports 190. For instance, there may be different queues 140 assigned to a port 190 to store different types of data units 105, to store data units 105 with different priority levels, and/or for other purposes.

A data unit 105 may be enqueued in more than one queue 140 if it is to be transmitted to multiple ports 190. For each port 190 to which a data unit 105 is to be sent, the enqueue logic 120 may utilize various rules to resolve a data unit 120 to a specific queue 140 associated with that port 190.

In an embodiment, the enqueue logic 120 is configured to link two or more small data units together when enqueueing the data units (e.g. using interpacket linking data). The enqueue logic 120 may do so, for instance, when rate adjustment logic has increased a maximum service rate for a port associated with the queue in which the data units are being enqueued, as described in other sections. As a consequence of such an action, in some embodiments, the linked data units may appear as a single data unit to dequeue logic 130 when it comes time to dequeue the linked data units, and thus be dequeued at the same time in manner that is transparent to the dequeue logic 130.

DEQUEUE LOGIC

Queue manager 110 further includes dequeue logic 130. Dequeue logic 130 is configured to dequeue data units 105 from queues 140. The process of dequeuing a data unit 105 from a queue 140 comprises various steps, depending on the embodiment, such as removing the data unit 105 from the head of the queue 140, locating the data unit 105 in a buffer, and reading the dequeued data unit 105 from the buffer. A dequeued data unit 105 may further be removed from a corresponding buffer when if it is no longer in any of the queues 140. The dequeue logic 130 further includes or is coupled to transmission logic for transmitting each dequeued data unit 105 to the appropriate port 190 or other downstream logic.

Subsystem 100 is coupled to a clock (not depicted), whose signals indicate intervals of times referred to herein as clock cycles. Dequeue logic 130 may dequeue only a limited number of data units 105, or even just one data unit 105, per clock cycle. Depending on the embodiment, the dequeue process for a data unit may be completed in the same clock cycle in which it began, or the dequeue process may take place over a time period spanning multiple clock cycles, in which case it may be performed concurrently with other dequeue processes in a pipelined manner.

The dequeue logic 130 is typically instructed (e.g. by the scheduler) as to the port(s) 190 for which a data unit 105 should be dequeued in a given clock cycle. The dequeue logic 130 identifies the queue(s) 140 associated with each indicated port 190, and selects a specific one of those queues 140 from which to dequeue a data unit 105. If more than one queue 140 is associated with a port 190, the dequeue logic 130 may utilize any suitable selection mechanism to select between those queues 140 in a given clock cycle (e.g. round-robin, most filled, probability-based mechanisms, percentage-based mechanisms, etc.).

2.4. Scheduler

Subsystem 100 further includes a scheduler 150. Scheduler 150 instructs dequeue logic 130 when to dequeue a data unit for a given port 190 in accordance to a port scheduling algorithm. Selecting a port 190 for which a data unit should be dequeued in a given clock cycle is also referred to herein as servicing the port 190. Although the examples described herein assume that the scheduler 150 selects at most only one port for servicing per clock cycle, in other embodiments there may two, three, or even greater numbers of ports 190 serviced in a given clock cycle.

Any suitable scheduling algorithm may be utilized, including without limitation round-robin algorithms, algorithms based on random or pseudo-random functions, algorithms based on probabilities, percentages, or weights assigned to each port 190, and so forth. In an embodiment, scheduler 150 intelligently services the ports 190 in such a manner that only ports 190 whose queues 140 have currently enqueued data are selected. That is, for instance, if queue 3 is empty (as depicted), the scheduler 150 will not select queue 3. To this end, scheduler 150 receives queue control data 115 from queue manager 110. Queue control data 15 may include a variety of information, depending on the embodiment, such as whether data is currently available in a queue 140 and/or for a port 190, a count of the number of data units currently within a queue 140 and/or available for a port 190, an indication that a data unit has been enqueued for a port 190 and/or queue 140, an indication if a queue 140 assigned to a port 190 is ready to be dequeued, and/or other relevant queue data 115. In an embodiment, queue control data 115 may further include one or more metrics, based on which the scheduler 150 may further adjust scheduling.

In an embodiment, the scheduling algorithm is such that each port 190 for which data is enqueued will be selected an approximately equal number of times over a given time period. In an embodiment, the scheduling algorithm may be weighted, such that one port 190 is serviced more frequently than others. For instance, the number of times a given port 190 is selected over a period of time relative to other ports 190 with available data may be approximately proportional to the speed of the network interface associated with the given port 190 relative to the speeds of network interfaces associated with the other ports 190. For instance, assuming port 0 is a 400 Gbps port, while port 1 is a 100 Gbps port, port 0 may be selected four times for each time port 1 was selected. In an embodiment, the scheduling algorithm may also or instead be weighted based on other factors, such as per-port performance metrics, queue sizes, or priority levels. These weights may change over time.

SEQUENCER

According to an embodiment, scheduler 150 utilizes a sequencer 160 to help determine the order in which to schedule ports 190 for servicing. Sequencer 160 generates and/or makes use of a sequence 165. The sequence 165 includes a plurality of slots, and each port 190 may be assigned one or more of the slots. For example, as depicted, the scheduler 150 utilizes a sequence 165 of six slots numbered, in order, 0 through 5.

Although sequence 165 includes only one slot for each port 190, a port 190 may be assigned more than one slot for various reasons. For example, certain ports 190 may be higher bandwidth ports 190, and hence need to be scheduled more frequently than other ports 190. For instance, supposing ports 0 and 1 are 400 Gb/s ports, while all other ports 190 are 100 Gb/s ports, ports 0 and 1 would need to be scheduled four times more frequently than the other ports 190. The sequencer 160 could generate or utilize a variety of sequences to achieve this objective, such as, for instance, 0, 1, 2, 0, 1, 3, 0, 1, 4, 0, 1, 5.

In an embodiment, the scheduler 150 selects the port 190 to service in an order based upon the sequence. For instance, the scheduler 150 may cycle through the slots in sequence 165 continually, selecting the next slot in the sequence 165 each clock cycle until the end is reached, at which point the sequence 165 begins anew. For example, using the depicted sequence 165, the scheduler 150 may select port 0 in a first clock cycle, port 1 in a second, port 2 in a third, port 3 in a fourth, port 4 in a fifth, and port 5 in a sixth. The scheduler 150 may then return to port 0 for the seventh clock cycle, select port 1 in the eight, and so on.

Depending on the embodiment, the sequencer 160 may range from a relatively trivial component that returns a predefined sequence 160, to a dynamic component that is constantly generating a sequence 165 out to some certain number of slots. In the former case, the sequence 165 may be fixed based on the hardware configuration of the ports 190. However, in some embodiments, port bandwidths may be at least partially configurable by a user, and hence the sequencer 165 may generate the sequence 165 programmatically based on the configuration (though the sequence 165 may not change much otherwise). In yet other embodiments, the sequencer 160 may intelligently generate the sequence 165 based on a variety of factors, such as device status data. The sequence 165 may be generated or regenerated at pre-defined intervals, or in response to various events or status-based triggers. The sequence 165 may be repeating or non-repeating, depending on the embodiment.

In an embodiment, the sequencer 160 may at times rearrange the sequence 165 in an at least partially random manner, so as to introduce jitter into the scheduling process. A port 190 would still have the same number of slots in the sequence 165, but the sequence 165 would change over time (e.g. 2,1,5,4,0,3 instead of 0,1,2,3,4,5).

PORT AVAILABILITY

In an embodiment, the scheduler 150 selects the next slot in the sequence 165 whose corresponding port 190 is currently available for servicing. The availability of a port 190 may depend on several factors. For example, in an embodiment, a port 190 may be serviced only if data is actually enqueued for the port 190. Whether or not data is enqueued for a port 190 may be specified directly in queue control data 115 received by the scheduler 150 each clock cycle, or scheduler 150 may keep track of enqueues and dequeues for the port 190 (as signaled in the queue control data 115), so that it has an accurate count of the number of data units 105 in the port's queues 140.

For example, as depicted in FIG. 1, the queue 140 associated with port 3 is empty, and port 3 may thus be determined to be unavailable for servicing. The sequence 165 indicates that port 3 fills the slot between port 2 and port 4—in other words, the scheduler 150 would normally select port 2 in a first clock cycle, port 3 in the second clock cycle, and port 4 in a third clock cycle. However, since port 3 has no data available, the second clock cycle would be wasted. Hence, the scheduler may skip port 3, so that port 2 is selected in the first clock cycle, followed by port 4 in the second clock cycle.

SERVICE RATES

The availability of a port 190 for service may further depend on other factors, such as service rate constraints. For example, hardware and/or logical constraints such as described elsewhere herein may make it undesirable or even impossible to service the same port 190 on back-to-back clock cycles, or more frequently than every third clock cycle, or at even lower rates, depending on the embodiment. A port 190 may thus be assigned a service rate that indicates how frequently the port 190 may be serviced. In some embodiments, all ports 190 have the same service rate. In other embodiments, there may be different service rates for different ports 190.

The scheduler 150 may include logic for enforcing a service rate. The scheduler 150 may store in its memory the identities of the port(s) 190 it has serviced in the most recent clock cycles. It may then decline to schedule a port 190 for the next clock cycle if doing so would result in the port 190 having a service rate higher than the service rate assigned to the port 190. Note that it is possible that, in view of the service rate constraints and/or the lack of data in other queues 140, no port 190 is serviced in certain clock cycles.

For example, with the depicted sequence, suppose that only queues 2 and 3 have data currently enqueued therein. Further suppose that each port 190 has a maximum service rate of 1 in 3 clock cycles. The scheduler 150 would skip the first two slots in sequence 165 since the associated ports 0 and 1 have no data, and schedule port 2 in a first clock cycle, followed by port 3 in the second clock cycle. For the third clock cycle, the scheduler 150 would skip the last slots of the sequence 165, since the associated ports 4 and 5 have no data, and again skip the first two slots of the sequence 165 for the same reason. Arriving at the slot for port 2, the scheduler 150 would determine that port 2 cannot be serviced since it was already serviced within the last three clock cycles. For the same reason, the scheduler 150 would determine to skip port 3, and hence no port would be scheduled. For the fourth and fifth clock cycles, however, ports 2 and 3 could be scheduled, respectively, since doing so would no longer violate their respective service rates. Now, supposing in the interim, data was enqueued for port 5. Port 5 would then be scheduled in the sixth clock cycle, and ports 2 and 3 could be scheduled for the seventh and eighth clock cycles without any service rate violations.

As another example, suppose a sequence 165 of 0,1,0,2, 0,3,0,4,5. Further suppose that, initially, only port 0 is occupied, and the each port has a maximum service rate of 1 in 2. Initially, the scheduler 150 would schedule port 0 every other clock cycle, and no port 190 would be serviced at other times. Supposing that ports 2 and 3 eventually enqueue data as well, the scheduler 150 would eventually fall into a pattern of 0,2,0,3,0,2,0,3 . . . , so long as ports 0, 2, and 3 have data.

In an embodiment, rather than scheduler 150 having logic for enforcing service rates, scheduler 150 may instead receive a signal indicating when a port 190 is ready for new data, and transmission of this signal may be based on a service rate for the port 190.

RATE ADJUSTER

According to an embodiment, scheduler 150 includes rate adjustment logic, also referred to as rate adjuster 155, configured to temporarily adjust the rate at which a port 190 is serviced responsive to certain events or conditions. For example, in some embodiments, such an event is a determination by dequeue logic 130 or other logic within queue manager 110 that certain smaller-sized data units are at the head(s) of certain queue(s) 140 associated with certain port(s) 190, or otherwise ready for transmission to downstream logic. When such an event or condition is detected, and optionally while the condition continues to persist, the rate adjuster 155 may temporarily increase the service rate for the associated port 190 by two, or by some other factor, depending on the embodiment.

The rate adjuster 155 may adjust the service rate for a port 190 in a variety of manners, depending on the embodiment. For instance, in some embodiments, the scheduler 150 does not actually change the service rate for calculation purposes, but rather additional mechanisms are enabled whereby the service rate realized by the scheduler 150 is effectively altered. Such mechanisms may include dequeuing multiple data units from a port simultaneously, temporarily storing one or more of those data units in a port FIFO, and/or enabling a pseudo port associated with that port FIFO within the sequence 165. Examples of such mechanisms are described in other sections.

In another embodiment, the rate adjuster 155 may simply lower the service rate used by the scheduler 150 when calculating when a port 190 may be re-serviced. Such an embodiment would rely on upstream and/or downstream logic to perform various measures to ensure that the port 190 could actually be serviced again within the time frame required. This may require the dequeue logic to enter into a special operation mode so that it may read data units and take appropriate follow-up measures more quickly. Or, this may require that other components transparently take certain measures to enable the faster service rate, such as preemptively dequeuing multiple data units at once or in response to a single request, linking such data units together prior to sending, separating such data units downstream, and so forth.

The conditions or events that trigger a change in service rate for a port 190 may vary depending on the embodiment. In some embodiments, rate adjuster 155 increases the service rate for a port 190 at least partially in response to detecting that a small data unit is about to be dequeued for the port 190. A small data unit may be, for instance, a data unit that is smaller than a threshold amount. The threshold may be fixed or user programmable. In an embodiment, the threshold is half the size of maximum size TDU. In an embodiment, a small data unit is any data unit that is smaller than the maximum TDU size. In an embodiment, in place of current data unit size, the rate adjuster may compare an average data unit size over a recent period of time to the threshold to determine when to adjust the service rate. In an embodiment, the rate adjuster may adjust the service rate at least partially based on metadata from downstream logic (e.g. one or more metrics that indicate congestion at a particular downstream port or component, etc.).

In some embodiments, rate adjuster 155 increases the service rate for a port 190 based at least in part on detecting that both the next data unit to be dequeued for the port 190 and the data unit that is second-in-line to be dequeued for the port 190 are small data units. The two data units may be considered small if they are both smaller than a threshold size, as described above, or if the two data units are, in aggregate, smaller than a threshold size. For instance, the rate adjuster 155 may increase the service rate for a port 190 if the next two data units are, in aggregate, smaller than the maximum TDU size (and thus can be transmitted together).

In some embodiments, only EOP data units 105 can be considered small. The rate adjuster 155 will thus only trigger a rate adjustment for a port 190 if the next two or more data units are EOP data units (meaning that at least the second-in-line data unit is an SEOP data unit). In an embodiment, in addition to being EOP data units, the data units must still be, in aggregate, smaller than a certain size (e.g. the maximum TDU size). Or, in an embodiment, in addition to being EOP data units, the data units must still be smaller than a certain size individually (e.g. half the maximum TDU size).

In an embodiment, the rate adjuster 155 may learn that the next data unit(s) for a port 190 are considered to be small based on queue control data 115 or other metadata from queue manager 110, and thus adjust the service rate. The rate adjuster 155 may return to the default service rate upon receiving an indication that the next data unit(s) for the port 190 are no longer considered to be small.

In other embodiments, when the next data unit(s) for a port 190 are considered to be small, the dequeue logic 130 is configured to automatically dequeue more than one data unit. The rate adjuster 155, upon detecting that the dequeue logic 130 has dequeued multiple data units, takes other appropriate actions to adjust the service rate for the port 190. The rate adjuster 155 returns to the original service rate when the dequeue logic 130 is no longer dequeue multiple data units for the port 190 (and/or when the multiple data units have been transmitted from to the port 190 from a port FIFO, as described in subsequent sections).

In an embodiment, rate adjuster 155 may be separate from the scheduler 150. For instance, the rate adjuster 150 may be implemented in queue manager 110 or in any other suitable component. The rate adjuster 155 may send instructions to the scheduler 150 to adjust the rate, and/or cause performance of any actions necessary to effect rate adjustment, in accordance to various techniques described herein.

2.5. Port FIFOS and Pseudo-Ports

Figure 2:
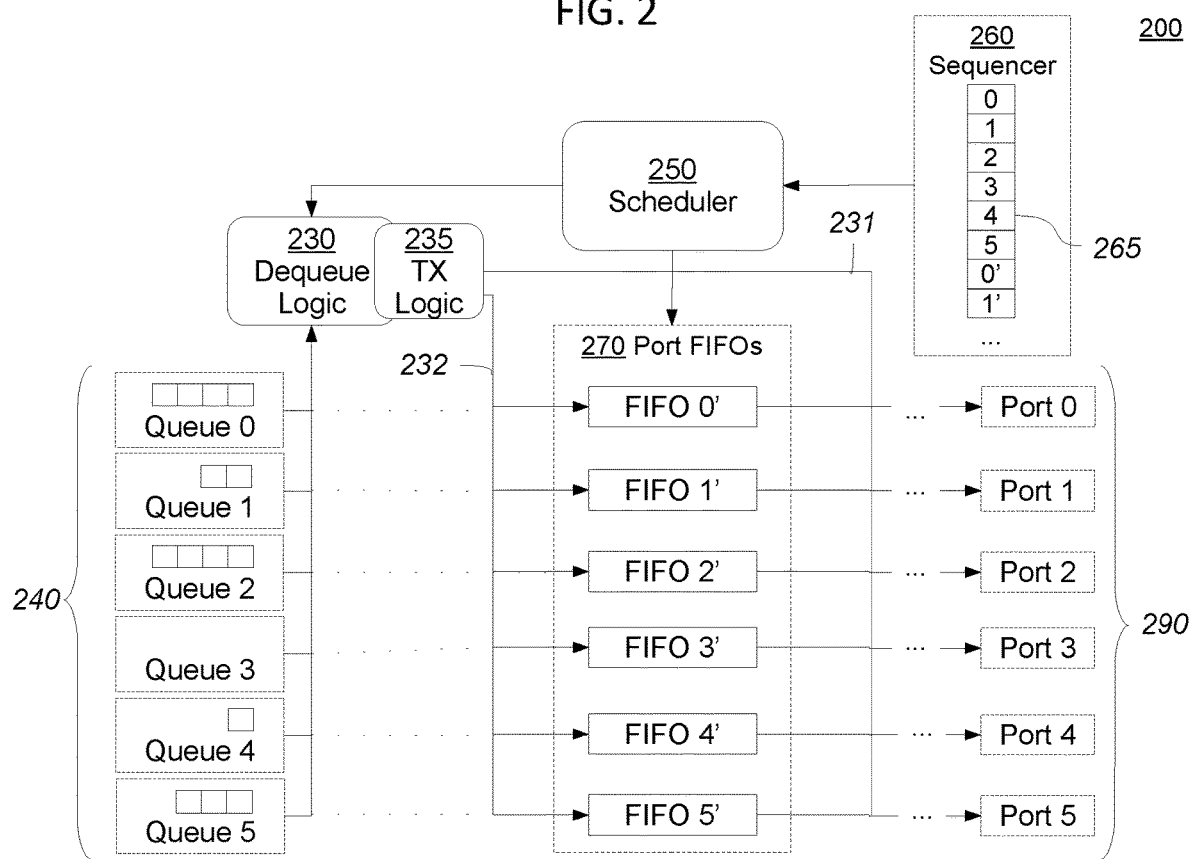
FIG. 2 illustrates a scheduler-based dequeue subsystem configured to utilize port FIFOs.

According to some embodiments, an increased service rate for a port 190 may be accomplished using port FIFOs, coupled with logic within the scheduler 150 that treats each port FIFO as a pseudo port. FIG. 2 illustrates a scheduler-based dequeue subsystem 200 configured to utilize port FIFOs 270, according to an embodiment. Subsystem 200 may be utilized within any device that utilizes schedule-based dequeuing, including without limitation within the traffic manager or ingress arbiter of a network device. Subsystem 200 may be a part of subsystem 100, or a separate subsystem. Conversely, subsystem 100 may, but need not necessarily, utilize the components and techniques described below with respect to subsystem 200.

Subsystem 200 includes dequeue logic 230 configured to dequeue queues 240 of data units, in a manner similar to that utilized by dequeue logic 130 in dequeuing queues 140. Moreover, subsystem 200 includes a scheduler 250 configured to schedule ports 290 for servicing, in a manner similar to that utilized by scheduler 150 for scheduling ports 190 for servicing. Just as scheduler 150 utilizes a sequence 165 maintained by a sequencer 160, scheduler 250 may utilize a sequence 265 maintained by a sequencer 260.

DEQUEUING MULTIPLE DATA UNITS TOGETHER

In an embodiment, if the next two or more data units to be dequeued for a port 290 are both small (e.g. each smaller than a threshold size, in aggregate smaller than a maximum TDU size, each EOP TDUs, etc.), dequeue logic 230 may dequeue more than one data unit for a port 290 at a time. Both data units are read and provided to the transmission logic as part of the same dequeue process. In such an embodiment, even though the rate at which the dequeue logic can perform dequeue events for a port 290 may not necessarily change, the rate at which data units are transmitted downstream is increased, because more than one data unit is dequeued at a time, thereby increasing the effective service rate for the port 290.

Depending on the embodiment, the dequeue logic 230 may dequeue multiple data units in different manners. For instance, rate adjustment logic may access control data or other metadata indicating the size and/or other characteristics of the next two data units in a queue. If the data units are both small, the rate adjustment logic may instruct the dequeue logic 230 to read and dequeue those data units in a single transaction.

As another example, there may be two or more queues 240 assigned to a port. When the dequeue logic 230 dequeues the EOP data unit from one queue 240, it may dequeue another data unit from another queue 240 assigned to the port 290 at the same time, if that data unit meets appropriate criteria (e.g. is a SEOP data unit smaller than a threshold size, small enough to be transmitted with the EOP data unit, etc.). In some embodiments, a port 290 may have a special queue 240 for SEOP data units, and the dequeue logic 230 may be configured to attempt to dequeue a second data unit from this queue whenever it dequeues an EOP data unit from another queue.

In an embodiment, when dequeuing an EOP data unit, the dequeue logic 230 may proactively search for a second small data unit that is ready to be dequeued. For instance, the dequeue logic 230 may search for such a second data unit in the queue that was just dequeued, and/or the head data unit of each other queue assigned to the port. If such a second small data unit is found, the dequeue logic 230 may dequeue that data unit as well.

In some embodiments, small data units may be linked together when enqueued (e.g. using interpacket linking data). Because the data units are linked, the dequeue logic 230 may not necessarily even know that it is dequeuing multiple data units.

PORT FIFOS

In an embodiment, rather than automatically outputting all dequeued data units immediately downstream, the dequeue logic 230 includes or is coupled to special transmission logic 235. The transmission logic 235 by default transmits dequeued data units to a port 290, or to intermediate downstream logic, via a primary path 231. However, the transmission logic 235 may in certain cases store dequeued data units in port FIFOs 270, which are coupled to the ports 290 via secondary paths 232.

For example, in an embodiment, a port 290 and/or the downstream logic between dequeue logic 230 and port 290 may be capable of processing only one data unit for the port per clock cycle. Hence, the transmission logic 235 may transmit the first dequeued data unit out the primary path 231 to the appropriate port 290 or associated downstream logic 290, and transmit the remaining dequeued data unit(s) out the secondary path 232 to the port FIFO 270 assigned to the port 290. These data unit(s) are written to the port FIFO 270, and dispatched to the port 290 in future clock cycles. Note that, since the data units buffered in a port FIFO 270 are eventually transmitted to the port 290 as well, dequeuing multiple data units may still effectively increase the service rate for the port 290 even when the port FIFO 270 is used.

There may be a port FIFO 270 for each port 290, though in some embodiments there may only be port FIFOs 270 for certain ports 290 (e.g. only high-speed ports 290). Each port FIFO 270 comprises a number of entries. In an embodiment, each entry in the port FIFO 270 is of sufficient width to hold a full-size data unit. In an embodiment, each entry in the port FIFO 270 is of sufficient width to store a data unit whose size is no larger than whatever threshold may be utilized to classify a data unit as "small" for the purposes of determining when to increase the service rate for a port 290. The number of entries may vary depending on the embodiment, from two or even one, up to any desired maximum size.

A port FIFO 270 may store a data unit in each entry. The port FIFO may use a first-in-first-out mechanism to organize the data units (e.g. a circular buffer), such that when reading from the port FIFO 270, the oldest data unit will always be read first. When a data unit is read from a port FIFO 270, the data unit is transmitted to the corresponding port 290, or intermediate downstream logic, and the entry in which the data unit was stored is freed for storing another data unit A data unit in the port FIFO 270 for a port 290 is no longer considered to be enqueued within the queue(s) 140 that are associated with that port 290. In an embodiment, the port FIFOs 270 are separate from any buffer in which data units are stored while they are enqueued in queues 140.

In an embodiment, if the port FIFO 270 for a port 290 already stores a data unit, the port FIFO 270 should be emptied before the transmission logic 235 transmits another data unit to the port 290 via the primary path 231, so as to avoid reordering issues. The transmission logic 235 may thus transmit all data units dequeued for the port 290 to the port FIFO 270 until the port FIFO 270 is again empty.

In an embodiment, dequeue logic 230 may only dequeue multiple data units for a port 290 if there is still room in the port FIFO 270 for that port 290. Accordingly, dequeue logic 230 may receive a signal from port FIFO management logic indicating whether or not the dequeue logic 230 may dequeue multiple data units for the port 290 in the upcoming clock cycle. Of course, if there is no port FIFO 270 for a port 290, the dequeue logic 230 should not dequeue more than one data unit for the port 290.

In some embodiments, such as when multiple dequeued data units are linked together or otherwise combined, the transmission logic 235 may include logic for splitting the dequeued data into multiple data units so that they may be transmitted along different paths 231/232.

PSEUDO-PORTS

Any suitable logic may be utilized to read and transmit data units from the port FIFOs 270. However, in some embodiments, dispatch of data units from the port FIFOs 270 is also managed by the scheduler 250. That is, the scheduler 250 determines when it is time for a port FIFO 270 to transmit a data unit stored therein, and instructs the port FIFO 270 to do so at the determined time. For any given clock cycle, the scheduler 250 may service a port 290 by instructing dequeue logic 230 to dequeue a data unit for that port 290 from a queue 240, and/or instructing a port FIFO 270 for that port 290 to transmit a data unit.

In an embodiment, the scheduler 250 may be configured to do so in a manner that effectively increases the service rate for the port 290 with minimal changes to the normal scheduling logic. The scheduler 250 may view each port FIFO 270 as a pseudo port. For instance, the port FIFO 270 for port 0 would be considered to be a pseudo port 0', the port FIFO 270 for port 1 would be considered a pseudo port 1', and so forth.

The sequencer 260 may add these pseudo ports to the sequence 265, so that each pseudo port has at least one slot in the sequence 265, separate from the slot occupied by its corresponding port 290. For instance, a sequence of ports 0-5 that includes pseudo ports might be 0,1,2,3,4,5,0',1',2', 3',4',5'. The scheduler 250 may select a pseudo port from the sequence 265 in the same manner it selects a normal port 290. When a pseudo port is selected from the sequence 265, instead of instructing the dequeue logic 230 to dequeue a data unit for the corresponding port 290, the scheduler instructs the port FIFO 270 for the pseudo-port to transmit a data unit. In an embodiment, a pseudo port is only selected if the port FIFO 270 associated with that pseudo port is determined to be active (e.g. contains at least one data unit).

In an embodiment, to avoid unfairly biasing a port 290 when its port FIFO 270 is active, the sequencer 260 may provide different sequences depending on whether a port FIFO 270 is currently active and/or whether there is currently data enqueued in the queue(s) 240 for that port 290. The ratio between the number of slots assigned to each port 290 in the sequences 265, including those assigned to both the actual port 290 as well as its pseudo port, should remain the same regardless of whether a pseudo port is active. For instance, a default sequence 265 might be 0,1,2,3,4,5. When a port FIFO 270 is active for port 0, the sequencer 265 might change the sequence to 0,1,2,3,4,5,0',1,2,3,4,5. Or, if there is not data in any queue 140 assigned to port 0, the sequencer 265 might change the sequence to 0',1,2,3,4,5. The sequence 265 would revert to normal when the port FIFO 270 is no longer active.

The underlying logic of the scheduler 250 need not actually change the service rate it enforces on a port 290, but may instead enforce the service rate constraint on a pseudo port separately from its associated port 290, or even not at all, in some embodiments. This results in increasing the effective service rate for the port 290, transparently to the underlying scheduling algorithm. For example, if the maximum service rate for port 0 is every other clock cycle, the service rate would prevent the scheduler 250 from scheduling port 0 for back-to-back clock cycles, even if no data were enqueued for any other port. However, if port 0' is active, the scheduler 250 could alternate between port 0 and port 0' in back-to-back clock cycles, since neither port 0 nor port 0' would exceed the maximum service rate. The effective service rate for port 0 would thus be doubled.

As another example, suppose a sequence of ports 0,1,0, 2,0,3,0,4. With ports 0 and 2 available, the scheduler 250 would schedule ports according to the following pattern: 0,2,0,2,0,2, . . . and so forth. Now suppose that a number of small data units are dequeued consecutively for port 0. As explained above, multiple of those data units may be dequeued concurrently, filling the port FIFO for port 0 (port 0'). The sequence may thus change to 0,1,0',2,0,3,0',4 (or another suitable sequence). The scheduler 250 would then schedule ports according to the following pattern: 0,0',2,0, 0',0,0',2,0,0' . . . and so forth.

2.6. Example Port FIFO Implementation for Single Port

Figure 3:
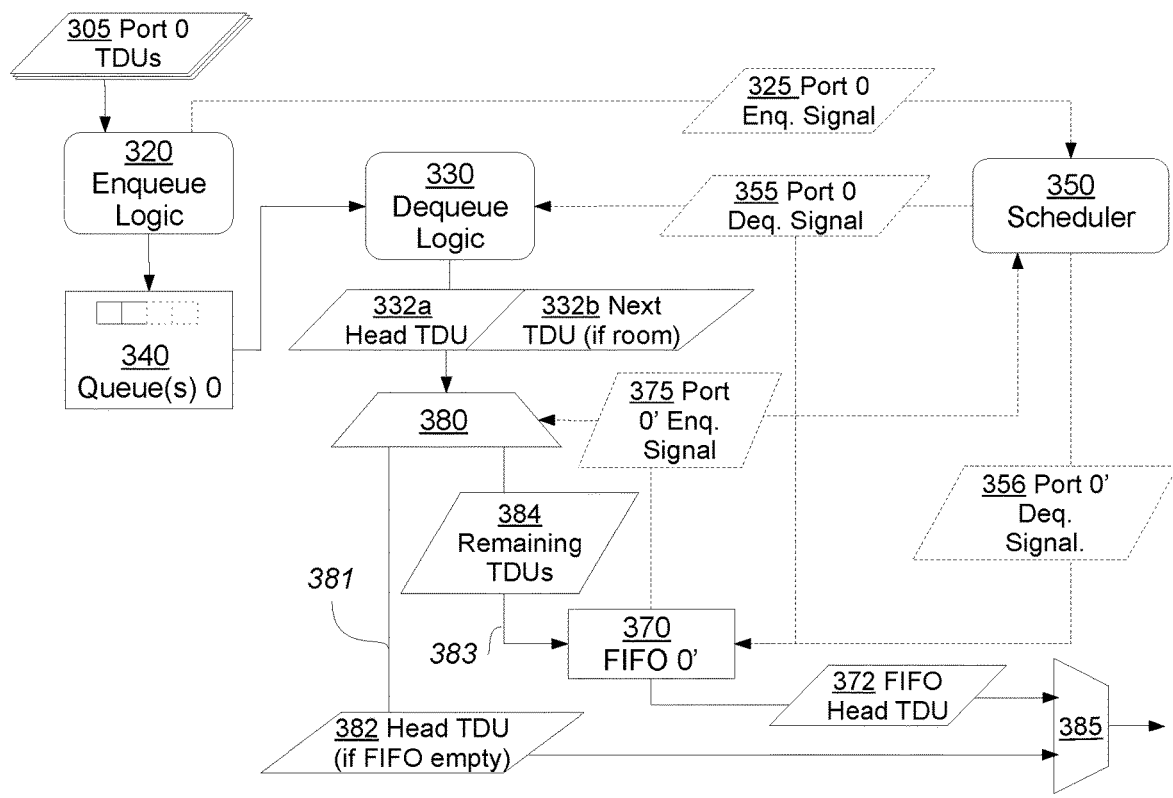
FIG. 3 is an illustrative view of components for a scheduler-based queueing subsystem, with respect to an individual port that utilizes a port FIFO.

FIG. 3 is an illustrative view of components for a scheduler-based queueing subsystem 300, with respect to an individual port that utilizes a port FIFO 370, according to an embodiment. Subsystem 300 may, in some embodiments, be the same as subsystems 100 and/or 200, but viewed from a different perspective. In other embodiments, subsystem 300 may be implemented without the specific details of FIG. 1 or 2, and subsystems 100 and 200 need not be implemented with the specific details of subsystem 300.

Subsystem 300 comprises enqueue logic 320 that receives requests to enqueue TDUs 305 destined for a port 0. The enqueue logic 320 may be similar to enqueue logic 120, for example. The requests are received at different times, and for each request, if permitted, the enqueue logic 120 adds the TDU identified in the request to a queue 340 that is associated with port 0. There may be one or more queues 340 associated with port 0, and any suitable selection mechanism may be utilized to select a specific queue 340 to add the TDU to. Queue(s) 340 may, in some embodiments, be similar to queues 140 and/or 240.

When enqueuing a TDU in a queue 340, enqueue logic 320 may send a signal 325 to a scheduler 350 indicating that data is currently enqueued for port 0. Based on the signal, scheduler 350 determines that port 0 is now active, in that there is data that needs to be dequeued for port 0. In some embodiments, enqueue logic 320 may continue to send the signal so long as data remains enqueued for port 0. In other embodiments, scheduler 350 may count the number of times it receives a signal 325, and use that count to calculate how many TDUs are enqueued for port 0.

When port 0 is active, the scheduler utilizes scheduling logic, such as described with respect to scheduler 250 and/or elsewhere herein, to determine when it is time to dequeue the next TDU from queue(s) 340. When the appropriate time arrives, the scheduler sends a signal 355 to dequeue logic 330 requesting that the dequeue logic 330 dequeue a TDU for port 0. If the scheduler 350 maintains a count of the number of TDUs enqueued for port 0, it may also decrement that count at this time.

When the dequeue logic 330 receives the signal 355 from the scheduler 350, the dequeue logic 330 selects one of the queues 340 associated with port 0, if there are more than one queue 340 that currently enqueue data for port 0. The queue 340 may be selected in any suitable manner. In an embodiment, if any TDU other than a SOP TDU is at a head of one of the queues 340, that queue 340 should be dequeued; otherwise, any queue 340 may be selected. Dequeue logic 330 may dequeue a TDU 332a from the head of the selected queue 340 in any suitable manner, such as described with respect to dequeue logic 230 and/or 130, or elsewhere herein.

In some embodiments, dequeue logic 330 may, on some occasions, dequeue more than one TDU 332. For example, in an embodiment, upon dequeuing a first TDU 332a from the head of one queue 340, if rate adjustment logic (e.g. in the dequeue logic 330 or at the scheduler 350) determines that TDU 332a meets certain first criteria, the rate adjustment logic may then check as to whether a next TDU 332b may also be dequeued. The first criteria may be, for instance, that TDU 332a is an EOP TDU and/or smaller than certain size (e.g. the maximum TDU size, a threshold TDU size, etc.).

The rate adjustment logic may check for the next TDU 332b at the head of the same queue 340 from which TDU 332a was just dequeued, and/or from the head of a different queue 340, depending on the embodiment. In order for dequeue logic 330 to dequeue the next TDU 332b, the next TDU 332b must meet second criteria. These second criteria may include one or more of: TDU 332b is a SEOP TDU, TDU 332b is smaller than a threshold size, and/or TDU 332b and TDU 332a combined are less than a threshold size (e.g. the maximum TDU size, the size of a certain bus, etc.). If the second criteria are met, TDU 332b may be dequeued at the same time as TDU 332a.

In an embodiment, the rate adjustment logic may continue to look for additional TDUs 332 to dequeue with TDU 332a, so long as the combined size of all dequeued TDUs is lower than a threshold size.

In an embodiment, the dequeue logic 330 may dequeue multiple TDUs 332 in a manner that is transparent to the dequeue logic 330. Rather, rate adjustment logic in the enqueue logic 320, or in some other upstream logic, may have determined that TDUs 332a and 332b were both small TDUs, using logic similar to the above, and linked multiple TDUs together (e.g. at a SDU level), such that they appear to the dequeue logic 330 as a single TDU.

As with dequeue logic 230, dequeue logic 330 includes or is coupled to special transmission logic for outputting dequeued data units. This transmission logic includes a splitter 380 to which the dequeued data 332 is sent. Splitter 380 is configured to output a TDU 382 on a primary path 381 to downstream logic and/or send non-outputted TDU(s) 384 along a secondary path 383 to a port FIFO 370, maintained by the transmission logic for temporary storage, depending on the state of subsystem 300. In a default state, if the data output 332 by dequeue logic 330 comprises just one dequeued TDU 332a, it passes through the splitter 380 as TDU 382. A switch 385 controls the ultimate output of subsystem 300. For any clock cycle in which switch 385 receives a TDU 382 on the primary path 381, the switch 385 outputs the TDU 382.

Further in the default state, if the output 332 from dequeue logic 330 comprises two or more TDUs 332, the splitter 380 splits a first TDU 382 from the remaining TDUs 384. The first TDU 382 is again outputted via the primary path 381, the one or more remaining TDUs 384 are stored as separate entries in the port FIFO 370.

However, if the port FIFO 370 is active, in that it stores one or more TDUs, the splitter 380 receives a signal 375 indicating that port FIFO 370 is active. It may continue to receive the signal 375 until the port FIFO 370 is inactive, or a separate signal may be sent when the port FIFO 370 is finally empty, depending on the embodiment. In any event, while the port FIFO 370 is active, the splitter does not output data via the primary path 381 at all. Rather, all of the data 332 is outputted along the secondary path 383 and stored in the port FIFO 370.

When the port FIFO 370 becomes active, it also sends signal 375 to the scheduler 350, which interprets the signal 375 as indicating that data is now enqueued in the pseudo port 0'. The scheduler 350 may thus determine whether port 0' is active based on signal 375 in the same manner it determines whether port 0 is active from signal 325. Whenever port 0' is active, the scheduling logic of the scheduler 350 may schedule port 0' for dequeuing in addition to or instead of port 0. In an embodiment, if the scheduling sequence does not already include port 0', the scheduler 350 may switch to a new scheduling sequence that includes port 0'.

When scheduler 350 schedules port 0' for dequeuing, the scheduler sends a signal 356 to the port FIFO 370 indicating that the port FIFO 370 should release the TDU 372 at the head of the port FIFO. The port FIFO 370 outputs the TDU to the switch 385. For any clock cycle in which the switch 385 receives a TDU 372 from the port FIFO 370, the switch 385 outputs that TDU 372 from subsystem 300. The signal 375 may also, in some embodiments, be sent to the switch 385, so that it is simpler for the switch 385 to determine when to switch between the primary path 381 and the port FIFO 370.

In addition, the scheduler 350 may send signal 355 to port FIFO 370 at the same time it sends signal 355 to dequeue logic 330. If the port FIFO 370 is active, the port FIFO 370 should output the TDU 372 at the head of the port FIFO 370, since, to avoid ordering problems, any TDUs dequeued by dequeue logic 330 in that clock cycle will be added to the port FIFO 370 instead of transmitted along the primary path 381.

2.7. Example Port FIFO Operation

The operation of a port 0 and a pseudo-port 0' for an associated port FIFO are now considered over a series of clock cycles. For simplification, it is assumed that all other ports are inactive during those clock cycles, and that port 0 is associated with a single queue. In each clock cycle, some or none of the following events may occur, depending on traffic patterns and other factors.

First, a new data unit may be enqueued in the queue for port 0.

Second, a port may be scheduled for dequeuing, which is either port 0 (corresponding to the queue) or the pseudo-port 0' (corresponding to the port FIFO). A service rate constraint prevents selection of port 0 in back-to-back clock cycles.

However, in an embodiment, no service rate constraints apply to pseudo-port 0', and hence pseudo-port 0' can be scheduled in back-to-back clock cycles. In other embodiments, there may be a service rate constraint on pseudo-port 0'.

In an embodiment, pseudo-port 0' must be activated before it can be scheduled, and the port FIFO must store contents before pseudo-port 0' can be activated. It may take a number of clock cycles after the port FIFO stores contents to actually activate the pseudo-port 0' depending on the implementation. However, in other implementations, activation may occur immediately. Pseudo-port 0' is deactivated when the port FIFO is empty.

Third, if a port has been scheduled for dequeuing, a single data unit is outputted to port 0. The outputted data unit may be forwarded directly to port 0, or to intervening logic, such as a packet processor or traffic manager. If there are no contents in the port FIFO, and port 0 is scheduled, the data unit may be outputted directly from the head of the queue (the top of the queue contents column in the previous cycle). Otherwise, if port 0 or port 0' is scheduled, a data unit is outputted from the head of the port FIFO (the top of the port FIFO contents column in the previous cycle).

Fourth, if port 0 is scheduled, one or more data units may be moved from the head of the queue to the port FIFO. If a data unit is already being outputted directly from the queue to port 0, only one data unit is moved to the port FIFO, and only if it is an SEOP data unit that can fit on the same bus as the other data unit. If the port FIFO already stores content, one or two data units may be moved from the head of the queue to the port FIFO when port 0 is scheduled. The number of data units moved to the port FIFO depends on their sizes and the number of data units in the queue (e.g. no bigger in aggregate than the maximum TDU size).

In an embodiment, the depth of the port FIFO may be constrained. For instance, the port FIFO may be only two entries. The dequeue logic may be modified to avoid moving further data units to the port FIFO if the port FIFO has no room for the data units.

2.8. Miscellaneous

Subsystems 100, 200, and 300 are merely examples of logic components for implementing scheduler-based queueing within a network device or other computing device. Other implementations may include fewer and/or additional components in varying arrangements, and the distribution of work between components may likewise vary.

In an embodiment, instead of being implemented in a system where the queues correspond ports to which the data units are being sent, the queues may correspond to other constructs, such as ingress ports, traffic flows, traffic types, service classes, and so forth. The slots of sequence 160/260 may be assigned to these other constructs instead of ports.

3.0. Functional Overview

This section describes example process flows for queueing and dequeuing data units in with an enhanced scheduler, such as described with respect to subsystems 100, 200, and/or 300 above. The flows may be performed within the switches and network devices described in other sections and/or in other computing devices. In an embodiment, each flow may be performed by a subsystem 100, 200, or 300, though the flows may similarly be performed in other queueing subsystems, and subsystems 100, 200, and 300 need not be limited specifically to performance of the example flows described below.

In an embodiment, each of the processes described in connection with the functional blocks described below may be implemented using one or more integrated circuits, logic components, computer programs, other software elements, and/or digital logic in any of a general-purpose computer or a special-purpose computer, while performing data retrieval, transformation, and storage operations that involve interacting with and transforming the physical state of memory of the computer.

3.1. Enqueuing a Data Unit

Figure 4:
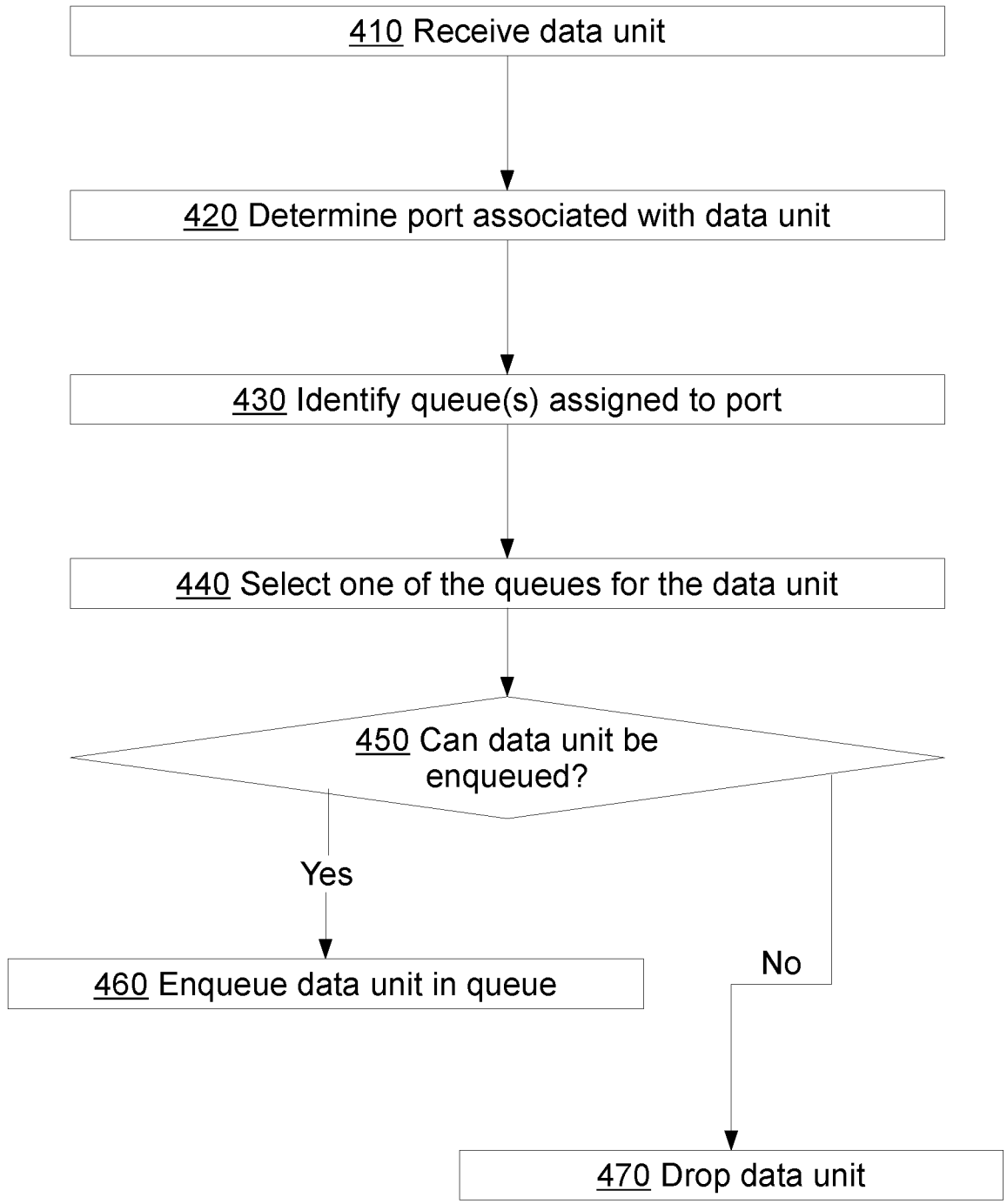
FIG. 4 illustrates an example flow for enqueuing a data unit in a queue.

FIG. 4 illustrates an example flow 400 for enqueuing a data unit in a queue, according to an embodiment. Block 410 comprises receiving a data unit, such as a TDU, PDU, or other data unit. In an embodiment, the data unit may be received at a traffic manager, ingress arbiter, or other component within a network device that needs to queue data units prior to outputting those data units to downstream logic. In some embodiments, in response to block 410, the data unit may be placed in a buffer.

Block 420 comprises determining a port associated with the data unit. The port may be determined in any suitable manner. For example, the port may be a destination port specified by control information passed along with the data unit from upstream logic (e.g. an ingress packet processor). Or, the port may be a destination port determined using forwarding logic based on address information and/or other suitable metadata within the data unit, or within another data unit belonging to a same PDU. As yet another example, the port may be an ingress port from which the data unit was received.

Block 430 comprises identifying one or more queues assigned to the port. In some embodiments, there is only one queue assigned to the port, while in others there may be more. Different ones of these queues may, for instance, be assigned to hold data units having different characteristics, such as belonging to a specific traffic flow or group of flows, having a certain priority level, originating from a certain source, carrying a certain type of data, and so forth. There may also be multiple queues for load balancing or other purposes.

Block 440 comprises selecting one of these queues to assign the data unit to, based on the characteristics of the data unit. Block 440 is, of course, a trivial step if there is only one queue for the port.

Block 450 comprises determining whether the data unit may be enqueued in the selected queue. Under certain circumstances, the enqueue logic of a device may prevent a data unit from being enqueued. For instance, if the selected queue is above a certain queue size or exhibiting a certain amount of delay, the enqueue logic might determine not to enqueue the data unit.

If the data unit may be enqueued, flow 400 proceeds to block 460, which comprises enqueueing the data unit in the queue. The data unit is added to the end, or tail, of the queue, typically by generating linking data that links the data unit (e.g. by reference to a location in which the data unit is stored) to the data unit that was previously at the tail of the queue, or generating new linking data for the queue if there is no data unit in the queue. For instance, in an embodiment, block 460 may be performed by enqueue logic, such as enqueue logic 120 or 320, within the implementing component of the network device.

If the data unit cannot be enqueued, flow 400 proceeds to block 470, which comprises dropping the data unit without the data unit being enqueued in the selected queue. The data unit may be deleted from any buffer entry in which it was stored, if not enqueued elsewhere.

Flow 400 is but one example method flow for enqueuing a data unit. Other flows may include fewer, additional, or different steps in varying arrangements. For instance, in an embodiment, multiple ports may be associated with the data unit, and blocks 420-440 are repeated for each port. Depending on the embodiment, various other steps may occur during the enqueue process, such as generating a signal to scheduling logic indicating that an enqueue event occurred, updating statistical counters or other information in the implementing device, and so forth.

Flow 400 is repeated each time a data unit is received at the implementing component of the network device, resulting over a period of time in the enqueuing of many data units in multiple queues for multiple ports.

3.2. Scheduling Dequeue Operations

A dequeue operation is used to dequeue a data unit that has been enqueued per flow 400, so that it may be transmitted to the associated port and/or to downstream logic for further processing. Since enqueue operations may sometimes be performed more frequently than dequeue operations can be performed for a port, a scheduling process is utilized to determine when a given data unit from a given queue can be dequeued. Example dequeue process flows are described in other sections.

Figure 5:
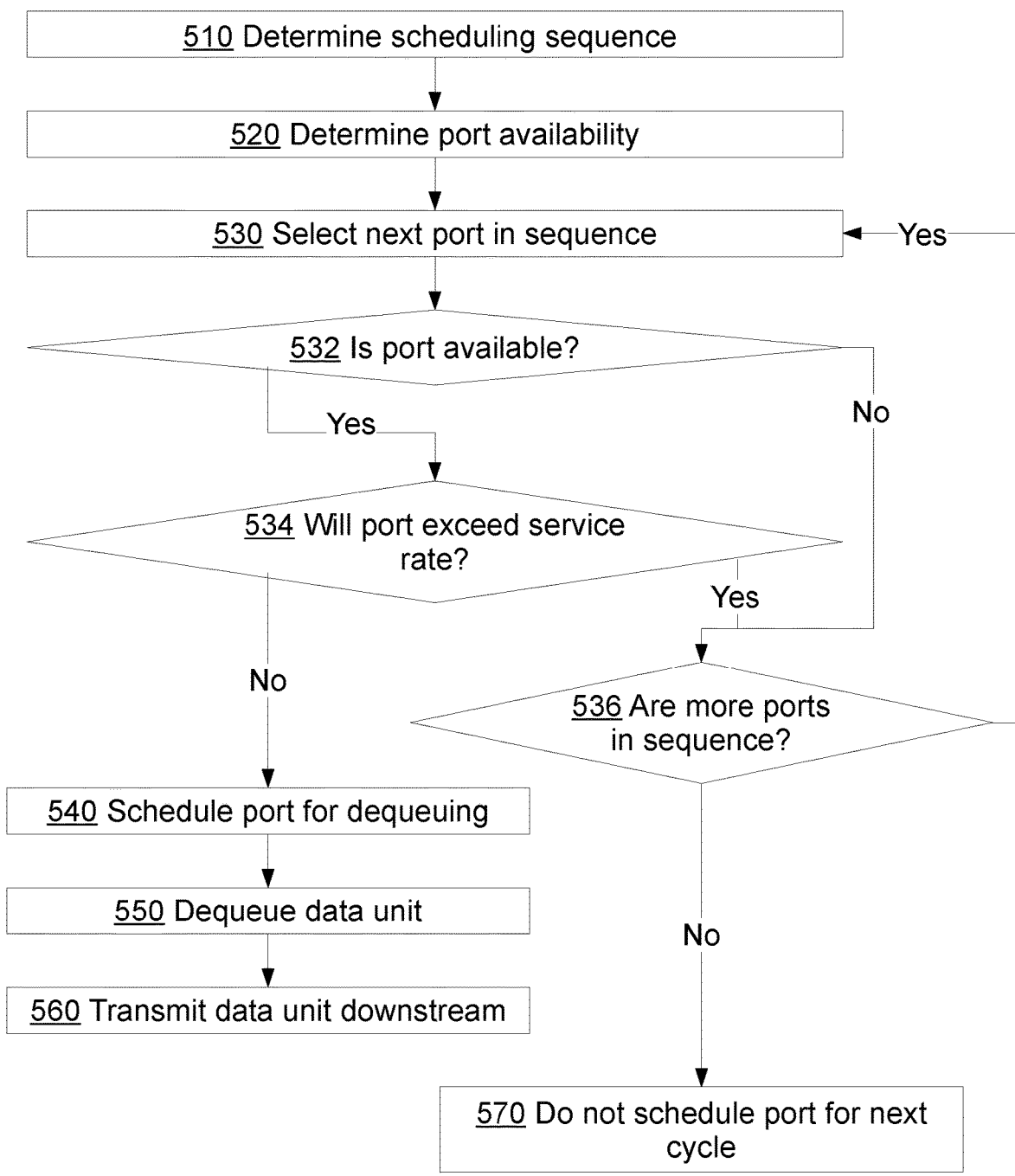
FIG. 5 illustrates an example flow for scheduling a dequeue operation.

FIG. 5 illustrates an example flow 500 for scheduling a dequeue operation, according to an embodiment. Flow 500 may be performed repeatedly (e.g. every clock cycle), so as to ensure that dequeue operations are performed as frequently as possible (e.g., again, each clock cycle). In some embodiments, flow 500 is performed one or more clock cycles in advance of the clock cycle in which the dequeue operation should begin, depending on the implementation. Flow 500 may be performed, for instance, by a scheduler 150, 250, or 350, or other suitable scheduling logic.

Block 510 comprises determining a scheduling sequence for the ports. The scheduling sequence is a sequence of slots, in which each slot is assigned to a different port, that indicates an order in which the ports may be selected. A port may have more than one slot in the sequence—for instance, the ratio of the number of slots assigned to a port relative to the number of slots assigned to another port may correspond to the ratio between their respective bandwidths. Sequences 165 and 265 are non-limiting examples of such a sequence.

The sequence may be determined in any suitable manner. In an embodiment, the sequence should not usually change between iterations of flow 500, but rather block 510 may be performed just once for any number of iterations of flow 500. In an embodiment, the sequence may have been generated or selected by other logic asynchronously to the rest of flow 500. Such logic may be triggered by certain conditions or events, such as activation of a port or pseudo-port, device configuration changes, changes in device state, etc. Or, the logic may repeatedly generate a schedule periodically or at other intervals based on the current device configuration and state. In such embodiments, block 510 may comprise accessing the sequence, or a portion thereof, in an appropriate memory location.

Block 520 comprises determining which ports have data available for dequeuing. The ports may be determined in any suitable manner. In an embodiment, a scheduler may maintain port status information that indicates a count of the number of data units available for each port. This count may be updated in response to enqueue events and dequeue events. In another embodiment, queue management logic may send status information to the scheduler, indicating which queues and/or ports currently have data enqueued. In yet another embodiment, a scheduler may have direct access to the queues, and be able to determine whether a port has data available by examining the queues directly.

Block 530 comprises selecting the next port in the sequence. For instance, there may be a pointer that indicates the last sequence slot to have been selected (e.g. in previous iterations of flow 500) or considered, or the first slot in the sequence if the sequence has recently been updated. Block 530 may involve advancing the pointer and reading the port from the next assigned slot.

Block 532 comprises determining if this port is available, based on the availability data. In other words, block 532 comprises determining whether any queue assigned to the port currently has data. If the port is available, then flow 500 proceeds to block 534. Otherwise, flow 500 proceeds to block 536.

Block 534 comprises determining whether scheduling the port for clock cycle will exceed a service rate for the port. For instance, if the port has an assigned maximum service rate of one in every four clock cycles, this may involve determining whether the port has been scheduled in any of the previous three clock cycles. If the service rate will not be exceeded, flow 500 proceeds to block 540. Otherwise, flow 500 proceeds to block 536.

If the port is available and does not exceed the assigned service rate, then, in block 540, the port is scheduled for dequeuing. This may involve, for instance, sending an instruction to dequeue a data unit in a queue associated with the port to dequeue logic for the upcoming clock cycle.

Flow 500 then proceeds to block 550, which comprises dequeuing a data unit from a queue associated with the port, as scheduled. The queue may be any queue associated with the port, if there are more than one queues associated with the port. The queue may be selected by the dequeue logic using any suitable means, or the scheduling logic may specify the queue to release a data unit from. In an embodiment, the selected queue is the queue from which a data unit was most recently released for the port, if the previously released data unit was not an EOP TDU. Otherwise, any suitable selection algorithm may be used to select the queue, including round-robin, random, priority-based, and so forth.

Dequeuing the data unit may involve a number of steps, depending on the embodiment, such as "popping" a node representative of the data unit from the head of the queue by manipulating linking data representative of the queue, locating one or more buffer addresses that store the data unit based on address information within the node, reading the data unit from those address(es), freeing the address(es) for other data, and so forth.

Flow 500 the proceeds to block 560, which comprises transmitting the data unit to downstream logic, such as a packet processor, traffic manager, transmit buffer, port, etc., depending on the component implementing flow 500. Note that, in an embodiment, blocks 540-560 may be referred to, collectively, as servicing the associated port. The process of servicing the port may actually span multiple clock cycles, and the clock cycle in which it was "scheduled" may simply be the clock cycle in which the process of dequeuing the data unit begins. Note that the dequeuing of data units may be pipelined, so that multiple data units are in various stages of being dequeued concurrently.

On the other hand, if the port is not available, or if the service rate for the port will be exceeded, the port cannot be serviced in the upcoming clock cycle. Flow 500 may thus proceed to block 536, which comprises determining whether there are any more ports in the sequence. If so, flow 500 returns back to block 530 for consideration of the next port in the sequence. Otherwise, flow 500 proceeds to block 570, in which the scheduling process terminates without a port having been scheduled for servicing in the upcoming clock cycle.

Flow 500 is but one example method flow for scheduling dequeue operations. Other flows may include fewer, additional, or different steps in varying arrangements. For instance, in an embodiment, rather than determining port availability for all ports up front in block 520, port availability is only determined when necessary in block 532. Moreover, blocks 532 and 534 may be reversed in order. In an embodiment, rather than following a fixed sequence, a ranking or other mechanism may be utilized to select the next port in block 530 based on other logic and/or factors. Depending on the embodiment, various other steps may occur during the dequeue process, such as generating a signal to scheduling logic indicating that a dequeue event occurred, updating statistical counters or other information in the implementing device, and so forth.

Moreover, as described subsequently, in some embodiments, multiple smaller data units may be dequeued simultaneously in block 550, though their transmission may in some cases be staggered through the use of a FIFO, cache, or other mechanism.

3.3. Increasing Service Rate for Small Data Units

Figure 6:
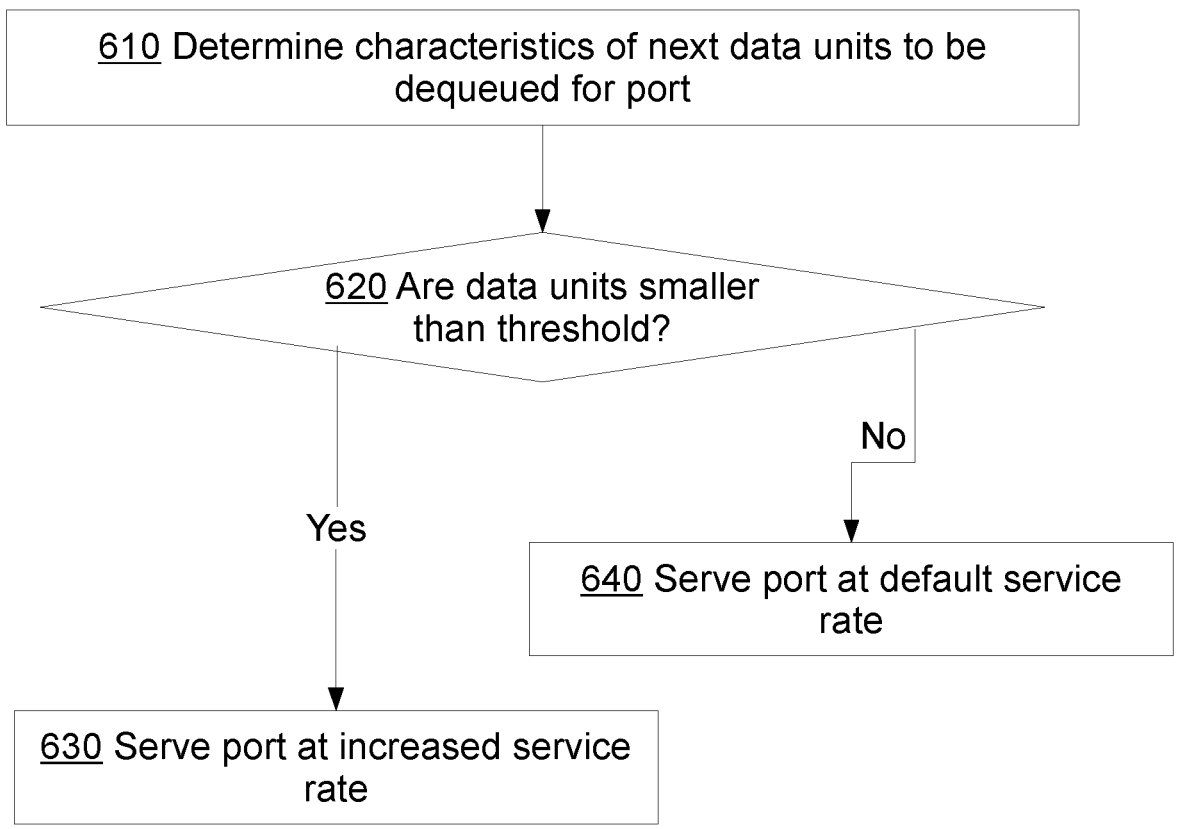
FIG. 6 illustrates an example flow for increasing the service rate of a port for smaller data units.

FIG. 6 illustrates an example flow 600 for increasing the service rate of a port for smaller data units, according to an embodiment. Flow 600 may be performed, for instance, by dequeuing logic and/or scheduling logic within a network device, such as described in other sections.

Block 610 comprises determining characteristics of upcoming data units to be dequeued for a port. The data units may be, for instance, one or two data units at the head of the next queue from which the dequeue logic will dequeue a data unit for the queue. For instance, if a PDU is currently in the process of being dequeued, the next queue may be the queue that contains the next data unit for that PDU. In an embodiment, the queues may include any number of queues, or even all queues, assigned to the port.

The characteristics may be determined using any suitable data. For instance, block 610 may comprise reading control data or other metadata for the data unit. In an embodiment, the determined characteristics may include the size of each of the data units. For instance, block 610 may entail determining that the next data unit to be dequeued is 64 bytes, and the data unit following it is 128 bytes. Or block 610 may involve determining that at least two different queues each have 64 byte data units at their heads. In an embodiment, rather than determining an actual size of the data units, it is only determined whether or not the data units are full-size data units, as described in other sections. In an embodiment, block 610 may also or instead comprise classifying a data unit as an SOP, EOP, MOP, and/or SEOP data unit, based on its position in a PDU.

Block 620 comprises determining whether the next data units are smaller than a threshold size. For instance, the threshold may be half the size of a full-sized TDU, and block 620 may comprise comparing the sizes of each of the next two data units to be dequeued to that threshold individually. In an embodiment, instead of being based on the sizes of the next data units individually, the determination may be based on the sizes of the next data units to be dequeued, combined. For instance, the threshold may be the size of a full-sized TDU, and the cumulative size of the next two data units to be dequeued may be compared to this size.

In an embodiment, blocks 610 and 620 may be performed as part of process of attempting to identify a set of data units to dequeue next, such that the set is guaranteed to be no greater than a full-sized TDU. Such a process may be triggered, for instance, upon determining that the next data unit to be dequeued is the EOP of a PDU that is currently in the process of being dequeued, or that the next data unit to be dequeued is a SEOP. Upon such a determination, scheduling logic or dequeuing logic may examine one or more other queues (or the next data unit in the same queue), to determine if any data unit at the head of one of those queues is smaller than a certain size (e.g. the difference between the next data unit to be dequeued and a full-size TDU).

If the next data units are smaller than the threshold, then in block 630, the port is served at increased maximum service rate. The service rate may be, for instance, doubled, increased by 50%, or any other suitable adjustment. In an embodiment, the service rate may be increased directly, in that a maximum service rate configuration setting that controls the maximum frequency with which scheduling logic selects a port for servicing is explicitly increased (e.g. increasing the service rate used in block 540 from every other clock cycle to, for instance, every clock cycle). In another embodiment, the service rate may be increased indirectly in a manner that is transparent to the underlying scheduling logic. This may be accomplished by, for instance, causing the dequeuing logic to dequeue multiple data units at once, activating a pseudo-port within a scheduling sequence, activating a port FIFO, and/or taking other measures as described elsewhere herein.

If, on the other hand, the next data units are larger than the threshold, then in block 640, the port is served at its default maximum service rate. In some embodiments, if the maximum service rate for the port is at an increased value due to previous iterations of flow 610 having branched to block 630, then block 610 may involve returning to the default service rate. For example, in an embodiment, this may involve returning a maximum service rate configuration setting to its default value. Or, this may involve disabling, or not activating, various features used to increase the maximum service rate indirectly. For instance, in embodiments where multiple data units may be dequeued to increase the service rate, block 640 may involve dequeuing only one data unit instead of multiple data units.

Flow 600 is but one example method flow for increasing the service rate of a port. Other flows may include fewer, additional, or different steps in varying arrangements. For example, although examples are given herein where only two data units are considered for dequeuing in block 630, in other embodiments, more than two data units may be dequeued if there is sufficient bandwidth (e.g. if the next three data units to be dequeued are cumulatively smaller than the maximum TDU size). Moreover, flow 600 may be repeated any number of times. In an embodiment, flow 600 may be performed in advance of each clock cycle.

In an embodiment, rather than being based on the size of the data unit alone, the determination of block 620 may be but one factor in a more complex algorithms for determining whether to branch to block 630 or 640. For instance, the algorithm may include a comparison of the average data unit size over a recent period of time to the threshold (or a different threshold, or a determination of whether a queue size or average queue size exceeds some threshold. Additional considerations for such an algorithm may be based on any other suitable metadata. For instance, such metadata may be received from downstream logic, such as the fill level of a buffer associated with a downstream component, an effective transmission rate of a port, a congestion flag, or any other suitable data. In an embodiment, such an algorithm need not necessarily include a comparison of the actual data unit size to a threshold.

3.4. Dequeuing a Normal Port Coupled to a Port FIFO

Figure 7:
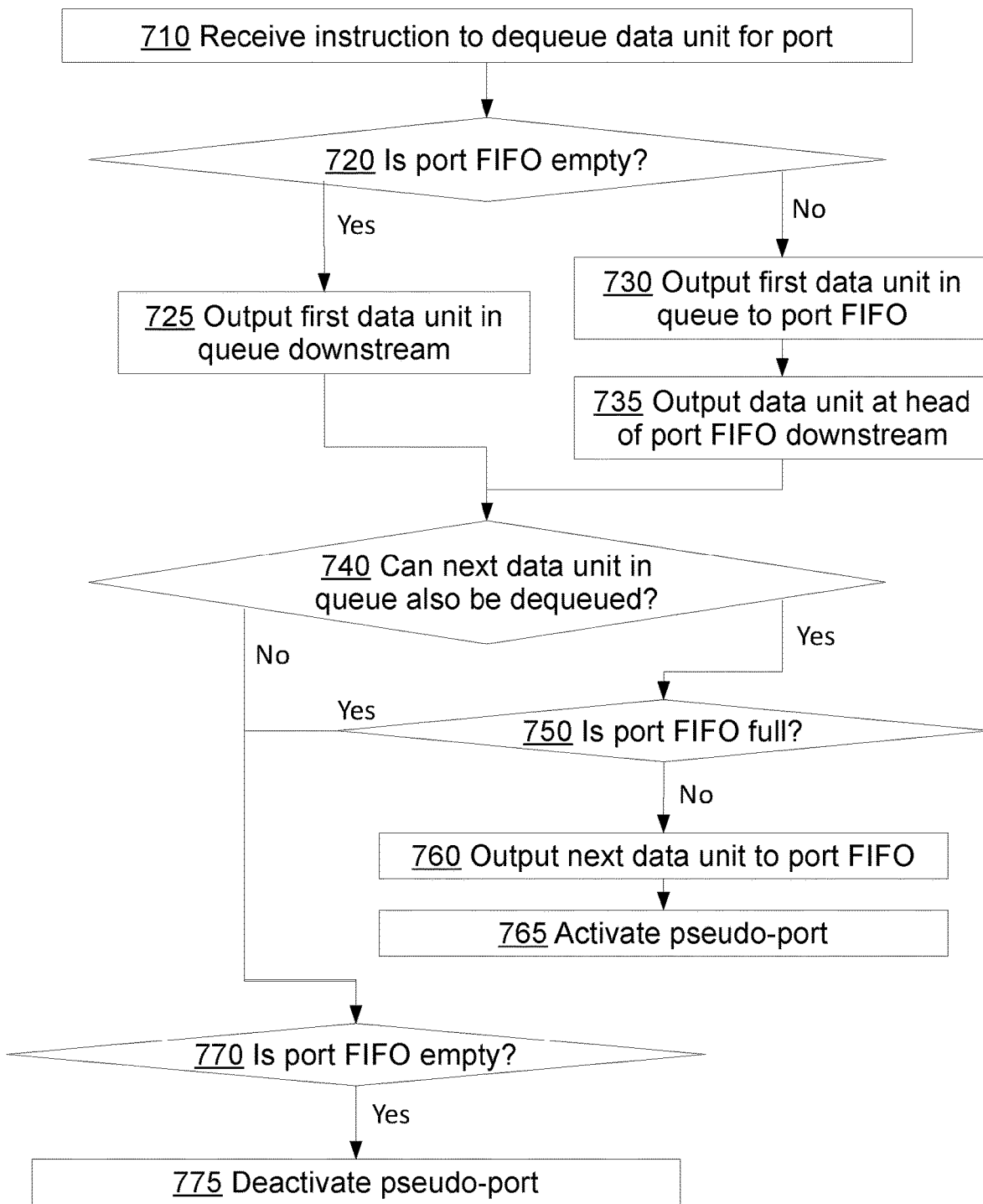
FIG. 7 illustrates an example flow for implementing a dequeue operation in response to a request to dequeue a normal port that is coupled to a port FIFO.

FIG. 7 illustrates an example flow 700 for implementing a dequeue operation in response to a request to dequeue a normal port that is coupled to a port FIFO, according to an embodiment. Flow 700 may be performed, for example, with respect to subsystems 200 and/or 300, as well as other queueing subsystems that utilize a port FIFO.

Block 710 comprises receiving an instruction to dequeue a data unit for a port. Such an instruction may be received, for instance, from scheduling logic that selects the port for servicing, such as, without limitation, in performance of block 540 of FIG. 5.

Block 720 comprises determining whether the port FIFO for the specified port is empty. If so, flow 700 proceeds to block 725, which comprises outputting the first data unit in one of the port's queues to downstream logic, such as to a packet processor, traffic manager, transmit buffer, etc. This may include various substeps, such as described with respect to blocks 550-560 of FIG. 5.

If, on the other hand, the port FIFO is not empty, then the data to output downstream should come from the port FIFO rather than the queue, so as to avoid ordering issues. Flow 700 thus proceeds to block 730. Block 730 comprises outputting the first data unit in the queue to the port FIFO instead of the downstream logic. Block 735 then comprises outputting the data unit at the head of the port FIFO to the downstream logic. Blocks 730 and 735 may be performed concurrently, or in any order.

From blocks 725 and 735, flow 700 proceeds to block 740. Block 740 comprises determining whether the next data unit in the queue may also be dequeued for the same time slot (e.g. the same clock cycle, the same set of clock cycles used to dequeue the first data unit, etc.). In an embodiment, the next data unit may also be dequeued if both it and the first data unit (that was outputted in block 725 or 730) are smaller than a certain size, individually, or in combination. In an embodiment, the next data unit may be dequeued if it is an SEOP and the first data unit was an SOP. In an embodiment, the next data unit may be dequeued if it is smaller than the bandwidth remaining on a transmission bus from the queue after the first data unit is outputted.

If the next data unit can also be dequeued, then flow 700 proceeds to block 750, which comprises determining whether the port FIFO is full. The port FIFO is considered full if it does not have room to store the next data unit, and/or has a predefined maximum number of data units already stored within it, depending on the embodiment. If the port FIFO is not full, then the next data unit is outputted to the port FIFO in block 760.

Then, in block 765, the port's pseudo-port is activated, if it is not already active. This may comprise, for instance, adding the pseudo-port to a list of active ports considered by the scheduling logic, selecting an updated scheduling sequence that includes the pseudo-port, or taking any other steps described herein.

If, on the other hand, it was determined in block 740 that the next data unit cannot also be dequeued, or if the port FIFO is full in block 750, then the next data unit is not outputted from the queue at this time, and flow 700 proceeds to block 770. Block 770 comprises determining whether the port FIFO is empty. If so, then the port's pseudo-port is deactivated.

Flow 700 is but one example method flow for dequeuing a port. Other flows may include fewer, additional, or different steps in varying arrangements. For example, blocks 740 and 750 may be reversed. As another example, the various determinations of flow 700 may actually be performed in advance of the time slot in which the data unit(s) are outputted, based on the expected states of the associated queue and port FIFO. The data unit(s) may then be outputted concurrently in the same clock cycle or other slot of time, in accordance to the determinations previously made.

As another example, a port may have more than one queue assigned to it. Flow 700 may thus include a step of determining the queue from which to dequeue the first data unit. In an embodiment, the queue of the next data unit is the same as this queue. In another embodiment, the next data unit may be selected from a different queue, and hence flow 700 may comprise selecting the different queue. In an embodiment, the next queue may be selected based on the sizes of the data units at the heads of the queues assigned to the data unit, so as to increase the likelihood that the next data unit can be dequeued.

In yet another embodiment, flow 700 may loop back to 740 from block 760 or 765 for consideration of whether a third, fourth, or other additional data unit may also be outputted to the port FIFO in the same time slot.

3.5. Dequeuing a Pseudo Port for a Port FIFO

According to an embodiment, activation of a port's pseudo-port, such as occurs in block 765, indirectly enables servicing of the port at an increased effective maximum service rate, since both the port and the pseudo-port may be scheduled independently, but the data outputted from servicing the port and the pseudo-port originates from the same set of queues. Conversely, once the pseudo-port is deactivated, the effective maximum service rate for the port returns to its default level by virtue of the pseudo-port no longer being available for scheduling.

Figure 8:
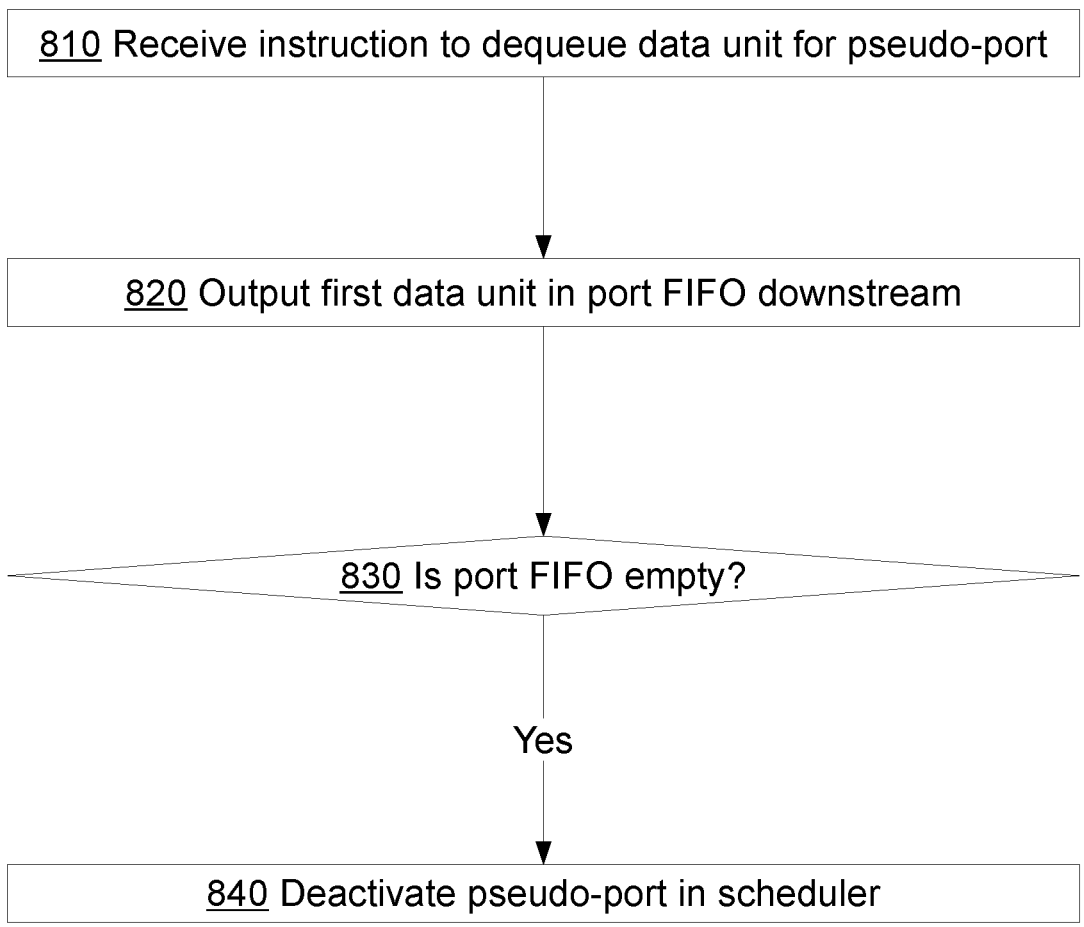
FIG. 8 illustrates an example flow for implementing a dequeue operation in response to a request to dequeue a pseudo-port associated with a port FIFO.

FIG. 8 illustrates an example flow 800 for implementing a dequeue operation in response to a request to dequeue a pseudo-port associated with a port FIFO, according to an embodiment. In some embodiments, flow 800 may be utilized in conjunction with flows 500 and/or 700. For example, flow 700 may be performed when the scheduling logic of flow 500 selects the port for servicing, while flow 800 may be performed when the port's pseudo-port is scheduled for servicing. However, flows 500 and 700 may also be performed without the specific details of flow 800.

Block 810 comprises receiving an instruction to dequeue a data unit for the pseudo-port. Such an instruction may be received from, for instance, from scheduling logic that selects the port for servicing, such as, without limitation, in performance of block 540 of FIG. 5. Receipt of such an instruction may only be possible when the pseudo-port is activated, such as may occur as a result of block 765 in flow 700, or in response to other events.

Block 820 comprises, in response to the instruction, outputting the data unit at the head of the port FIFO to downstream logic, such as described with respect to block 735 of flow 700.

Block 830 comprises determining whether the port FIFO is empty. If so, then in block 840, the pseudo-port is deactivated, as in block 775 of flow 700.

Flow 800 is but one example method flow for dequeuing a pseudo-port. Other flows may include fewer, additional, or different steps in varying arrangements.

4.0. Example Embodiments

Examples of some embodiments are represented, without limitation, as follows:

According to an embodiment, a network apparatus comprises: a plurality of ports configured to send and/or receive data units over one or more networks; enqueue logic configured to enqueue the data units in queues, in which the data units await transmission to one or more downstream logic components; dequeue logic configured to dequeue particular data units from the queues in response to instructions from scheduling logic; transmission logic configured to send the particular data units that have been dequeued by the dequeue logic to the one or more downstream logic components; the scheduling logic, configured to determine, at a given time, a given port of the ports to service, and send an instruction to the dequeue logic to dequeue data associated with the given port at the given time, the scheduling logic configured to service at least a first port of the ports no more frequently than at a defined service rate; rate adjustment logic configured to, based on sizes of certain data units, of the data units, that are assigned to the first port, and/or based on metadata received from the one or more downstream logic components, temporarily adjust the service rate from a first rate to a second rate.

In an embodiment, the rate adjustment logic is configured to adjust the service rate from the first rate to the second rate responsive to a determination that at least two data units associated with the first port are both ready to be dequeued and smaller than a particular size.

In an embodiment, determining that at least two data units associated with the first port are smaller than the particular size comprises at least one of: determining that the at least two data units are, in combination, smaller than a maximum data unit size.

In an embodiment, determining that at least two data units associated with the first port are smaller than the particular size comprises at least one of: determining that the at least two data units are, in combination, smaller than a user-programmable size.

In an embodiment, the rate adjustment logic is configured to adjust the service rate from the first rate to the second rate responsive to a determination that an average size of a plurality of the data units over a recent period of time is smaller than a particular size.

In an embodiment, the rate adjustment logic is configured to adjust the service rate from the first rate to the second rate responsive based on information conveyed to the rate adjustment logic from the one or more downstream logic components.

In an embodiment, the first rate is a rate at which the first port must be serviced to ensure that a defined bandwidth of the first port is realized when the first port is transmitting maximum-size data units, wherein the second rate is greater than the first rate.

In an embodiment, the first rate is once per every other clock cycle, wherein the second rate is once per clock cycle, wherein the bandwidth is at least 800 Gbps.

In an embodiment, the rate adjustment logic is configured to adjust the service rate by at least causing the dequeue logic to dequeue at least two data units for the first port concurrently at a particular time.

In an embodiment, the rate adjustment logic is configured to adjust the service rate by at least causing the enqueue logic to link two or more data units together when enqueueing the two or more data units in a queue associated with the first port;

In an embodiment, the dequeue logic to dequeue the two or more data units from the queue concurrently at a particular time in a manner that is transparent to the dequeue logic as a consequence of the linking.

In an embodiment, the rate adjustment logic is configured to adjust the service rate by at least causing the dequeue logic to dequeue multiple data units for the first port at a same time, wherein the transmission logic is configured to only send one data unit for the first port to the one or more downstream logic components at a time, wherein the transmission logic includes a port FIFO for the first port, the port FIFO configured to store at least one of the multiple data units for transmission to the one or more downstream logic components at a later time.

In an embodiment, when the port FIFO stores at least one data unit, the rate adjustment logic is configured to activate a pseudo-port for the first port in a port scheduling sequence for the scheduler, the first port and the pseudo-port separately selectable from the sequence at a frequency corresponding to the first rate, the first port thereby effectively serviced at the second rate.

In an embodiment, when the port FIFO stores at least one data unit, and the scheduler determines to service the first port or a corresponding pseudo-port in a given clock cycle, the scheduler is configured to instruct the transmission logic to transmit a next data unit in the port FIFO to the one or more downstream logic components instead of a newly dequeued data unit.

In an embodiment, each queue of the queues is assigned to exactly one of the ports, the queue holding only data units that are to be sent to or were received from the port assigned to the queue, the dequeue logic configured to, when instructed to dequeue a data unit associated with a particular port, select a particular queue of the queues assigned to the particular port from which to dequeue a particular data unit at the head of the particular queue.

In an embodiment, when the particular data unit is an end-of-packet data unit and the rate adjustment logic detects another end-of-packet data unit at the head of another queue assigned to the particular port, or immediately following the particular data unit in the particular queue, the dequeue logic is configured to dequeue both the particular data unit and the other end-of-packet data unit at the same time.

In an embodiment, the apparatus further comprises the one or more downstream logic components, the one or more downstream logic components being one or more traffic managers, one or more packet processors, or the plurality of ports.

In an embodiment, the queues are ingress queues and the one or more downstream logic components is a traffic manager. In an embodiment, the queues are egress queues maintained by a traffic manager that is buffering the data units in a buffer memory, and the one or more downstream logic components are packet processors. In an embodiment, a data unit is ready to be dequeued when it is at a head of a queue assigned to a port associated with the data unit, or when the data unit immediately follows an end-of-packet data unit at the head of the queue.

According to an embodiment, a method comprises: sending and/or receiving data units over one or more networks via a plurality of ports of a network apparatus; enqueueing the data units in queues, in which the data units await transmission to one or more downstream logic components of the network apparatus; dequeuing particular data units from the queues, the dequeuing including determining, at a given time, a given port of the ports to service, based at least on a constraint that a first port of the ports is serviced no more frequently than at a defined service rate, and dequeuing data associated with the given port at the given time; sending the particular data units that have been dequeued to the one or more downstream logic components; based on sizes of certain data units, of the data units, that are assigned to the first port, temporarily adjusting the service rate from a first rate to a second rate.

In an embodiment, adjusting the service rate from the first rate to the second rate is responsive to a determination that at least two data units associated with the first port are both ready to be dequeued and smaller than a particular size or that an average size of a plurality of the data units over a recent period of time is smaller than a particular size.

In an embodiment, the first rate is a rate at which the first port must be serviced to ensure that a defined bandwidth of the first port is realized when the first port is transmitting maximum-size data units, wherein the second rate is greater than the first rate.

In an embodiment, adjusting the service rate comprises dequeuing the at least two data units concurrently at a particular time.

In an embodiment, adjusting the service rate comprises dequeuing multiple data units for the first port at a same time, wherein only one data unit is sent for the first port to the one or more downstream logic components at a time, wherein the method further comprises: storing at least one of the multiple data units in a port FIFO for the first port; when the port FIFO stores at least one data unit, activating a pseudo-port for the first port in a port scheduling sequence; wherein determining the given port to service at the given time comprises selecting the given port using the port scheduling sequence, the first port and the pseudo-port separately selectable from the sequence at a frequency corresponding to the first rate, the first port thereby effectively serviced at the second rate; and when the port FIFO stores at least one data unit, upon determining to service the first port or a corresponding pseudo-port in a given clock cycle, transmitting a next data unit from the port FIFO to the one or more downstream logic components, instead of a newly dequeued data unit.

In an embodiment, each queue of the data unit queues is assigned to exactly one of the ports, the queue holding only data units that are to be sent to or were received from the port assigned to the queue; wherein the method further comprises, when dequeuing data associated with a particular port, selecting a particular queue of the queues assigned to the particular port from which to dequeue a particular data unit at the head of the particular queue; when the particular data unit is an end-of-packet data unit and there is another end-of-packet data unit at the head of another queue assigned to the particular port, or that immediately follows the particular data unit in the particular queue, dequeuing both the particular data unit and the other end-of-packet data unit at the same time.

In an embodiment, the one or more downstream logic components is one or more traffic managers, one or more packet processors, or the plurality of ports.

According to an embodiment, one or more non-transitory computer-readable media store instructions that, when executed by one or more computing devices, cause performance of the foregoing.

Yet other example embodiments are described in other sections herein.

5.0. Example Network Device

This section describes, in greater detail, example network devices in which the components and techniques described herein may be implemented. However, the techniques described herein are also useful in switches and contexts other than those described in this section.

5.1. Networks

Figure 9:
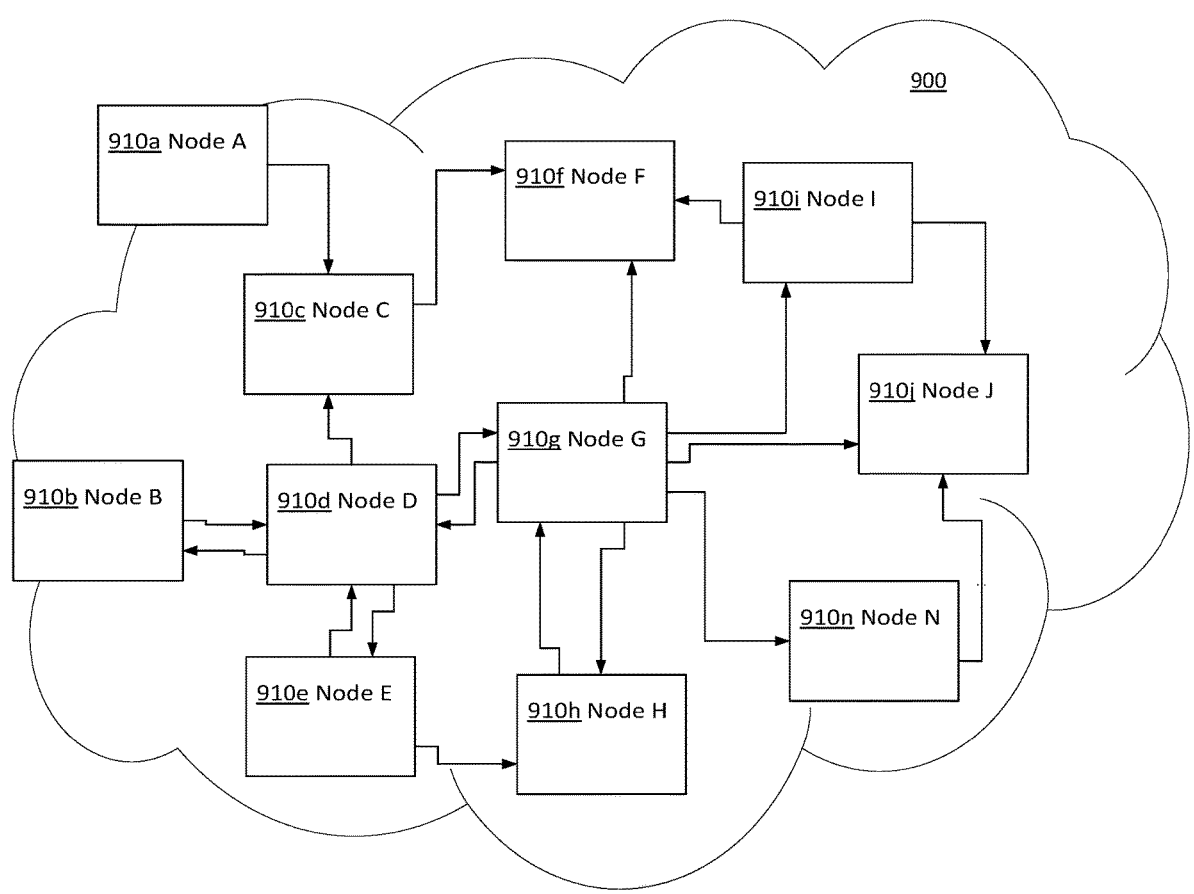
FIG. 9 is an illustrative view of various aspects of an example networking system in which the techniques described herein may be practiced.

FIG. 9 is an illustrative view of various aspects of an example networking system 900, also referred to as a network, in which the techniques described herein may be practiced, according to an embodiment. Networking system 900 comprises a plurality of interconnected nodes 910a-910n (collectively nodes 910), each implemented by a different computing device. For example, a node 910 may be a single networking computing device, such as a router or switch, in which some or all of the processing components described herein are implemented in application-specific integrated circuits (ASICs), field programmable gate arrays (FPGAs), or other integrated circuit(s). As another example, a node 910 may include one or more memories storing instructions for implementing various components described herein, one or more hardware processors configured to execute the instructions stored in the one or more memories, and various data repositories in the one or more memories for storing data structures utilized and manipulated by the various components.

Each node 910 is connected to one or more other nodes 910 in network 900 by one or more communication links, depicted as lines between nodes 910. The communication links may be any suitable wired cabling or wireless links. Note that system 900 illustrates only one of many possible arrangements of nodes 910 within a network. Other networks may include fewer or additional nodes 910 having any number of links between them.

While each node 910 may or may not have a variety of other functions, in an embodiment, each node 910 is configured to send, receive, and/or relay data to one or more other nodes 910 via these links. In general, data is communicated as series of discrete units or structures of data represented by signals transmitted over the communication links.

When a node 910 receives a unit of data, it typically examines addressing information within the unit of data (and/or other information within the unit of data) to determine how to process the unit. The addressing information may be, for instance, a Media Access Control ("MAC") address, Internet Protocol (IP) address, MPLS label, and/or any other suitable information. If the addressing information indicates that the receiving node 910 is not the destination for the data unit, the receiving node 910 may look up the destination node 910 within the receiving node's routing information and route the data unit to another node 910 connected to the receiving node 910 based on forwarding instructions associated with the destination node 910 (or an address group to which the destination node belongs). The forwarding instructions may indicate, for instance, an outgoing port over which to send the unit of data, a label to attach the unit of data, etc. In cases where multiple paths to the destination node 910 are possible, the forwarding instructions may include information indicating a suitable approach for selecting one of those paths, or a path deemed to be the best path may already be defined.

Addressing information, flags, labels, and other metadata used for determining how to handle a data unit are typically embedded within a portion of the data unit known as the header. The header is typically at the beginning of the data unit, and is followed by the payload of the data unit, which is the information actually being sent in the data unit. A header is typically comprised of fields of different types, such as a destination address field, source address field, destination port field, source port field, and so forth. In some protocols, the number and the arrangement of fields may be fixed. Other protocols allow for arbitrary numbers of fields, with some or all of the fields being preceded by type information that explains to a node the meaning of the field.

Different nodes 910 within a network 900 may send, receive, and/or relay data units at different communication levels, or layers. For instance, a first node 910 may send a unit of data at the transport layer (e.g. a TCP segment) to a second node 910 over a path that includes an intermediate node 910. This unit of data, which may sometimes first be broken into smaller units, may be encapsulated in units of data at various sublevels before it is transmitted from the first node 910. For example, a TCP segment may be encapsulated into IP packets, those IP packets may be encapsulated into Ethernet frames, and those Ethernet frames may eventually be sent out as a collection of signal-encoded bits to the intermediate device. Depending on the network layer at which the device operates, the intermediate node 910 may examine or, and in some cases reconstruct, the original frames, packets, and/or segment before routing that data to the second node 910. Or, the intermediate node 910 may simply examine the frames, or in some cases the packets as well, and route the data to the second node 910 without ever examining the original segment (or, in some cases, the packet).

Data units of the network layer at which a node 910 operates are considered protocol data units ("PDUs"), such as, without limitation, IP packets for the network layer (layer 3), frames for the Ethernet layer (layer 2), etc. A PDU may, for data unit handling purposes both within and without the device, be broken up into smaller subunits, or portions. The node 910 need not necessarily ever assemble the data in a PDU together, but rather may in an embodiment act upon constituent portions of the PDU, which may be linked together by identifiers, linked lists, or other suitable constructs. Within a node 910 itself, these portions are referred to herein as transport data units ("TDUs"). For instance, if the PDU is a packet, the TDU might be one or more cells. The first TDU in a PDU is referred to as the start-of-packet ("SOP"), while the last TDU in the PDU is referred to as the end-of-packet ("EOP").

Generally speaking, the TDU is the largest contiguous unit of data that certain internal components of a node 910 are configured to communicate between each other in a given period of time. For instance, a node 910 may have a traffic manager that is capable of receiving no more than a single TDU from each input interface it is connected to during a single clock cycle of the traffic manager. Additionally, though not necessarily the case in all embodiments, in at least some embodiments, the contiguous portions of data sent by each port of a node 910 in a given period of time may be no larger than a TDU. In an embodiment, each TDU is of a fixed size, except for the last TDU in a PDU, which may be of a size less than the fixed size.

In some embodiments, for physical storage purposes, a TDU may further be divided into chunks referred to as storage data units ("SDUs"). In an embodiment, an SDU is the largest contiguous portion of data that may be stored in a physical buffer entry of a particular buffer. In other words, the maximum size of an SDU is the same as the maximum size of a physical buffer entry. In an embodiment, the maximum number of SDUs in a TDU is fixed. However, an EOP TDU may have less than this number of SDUs. Moreover, the last SDU in a TDU (e.g. the EOP TDU) may be smaller than maximum SDU size.

In an embodiment, TDU and SDU boundaries may be relative to the component acting upon the data. That is, for example, a node 910 whose traffic manager is configured to use TDUs of a first size and SDUs of a second size may further include other components configured to communicate or buffer data units of sizes other than the first size and the second size.

For convenience, many of the techniques described in this disclosure are described with respect to embodiments where the PDUs are IP packets in a L3 (level 3) network, and the TDUs are constituent cells and/or frames in an L2 (level 2) network, in which contexts the described techniques have particular advantages. It will be recognized, however, that these techniques may also be applied to realize advantages in routing other types of data units conforming to other protocols and/or at other communication layers within a network. Thus, unless otherwise stated or apparent, the techniques described herein should also be understood to apply to contexts in which the PDUs, TDUs, and SDUs are of any other types of data structures, such as segments, InfiniBand Messages, or datagrams. That is, in these contexts, other types of data structures may be used in place of packets, cells, frames, and so forth.

Any node in the depicted network 900 may communicate with any other node in the network 900 by sending data units through a series of nodes 910 and links, referred to as a path. For example, Node B (910*b*) may send data units to Node H (910*h*) via a path from Node B to Node D to Node E to Node H. There may be a large number of valid paths between two nodes. For example, another path from Node B to Node H is from Node B to Node D to Node G to Node H.

In an embodiment, a node 910 does not actually need to specify a full path for a data unit that it sends. Rather, the node 910 may simply be configured to calculate the best path for the data unit out of the device (e.g. which egress port it should send the data unit out on). When a node 910 receives a data unit that is not addressed directly to the node 910, based on header information associated with a data unit, such as path and/or destination information, the node 910 relays the data unit along to either the destination node 910, or a "next hop" node 910 that the node 910 calculates is in a better position to relay the data unit to the destination node 910. In this manner, the actual path of a data unit is product of each node 910 along the path making routing decisions about how best to move the data unit along to the destination node 910 identified by the data unit.

5.2. Network Device

Figure 10:
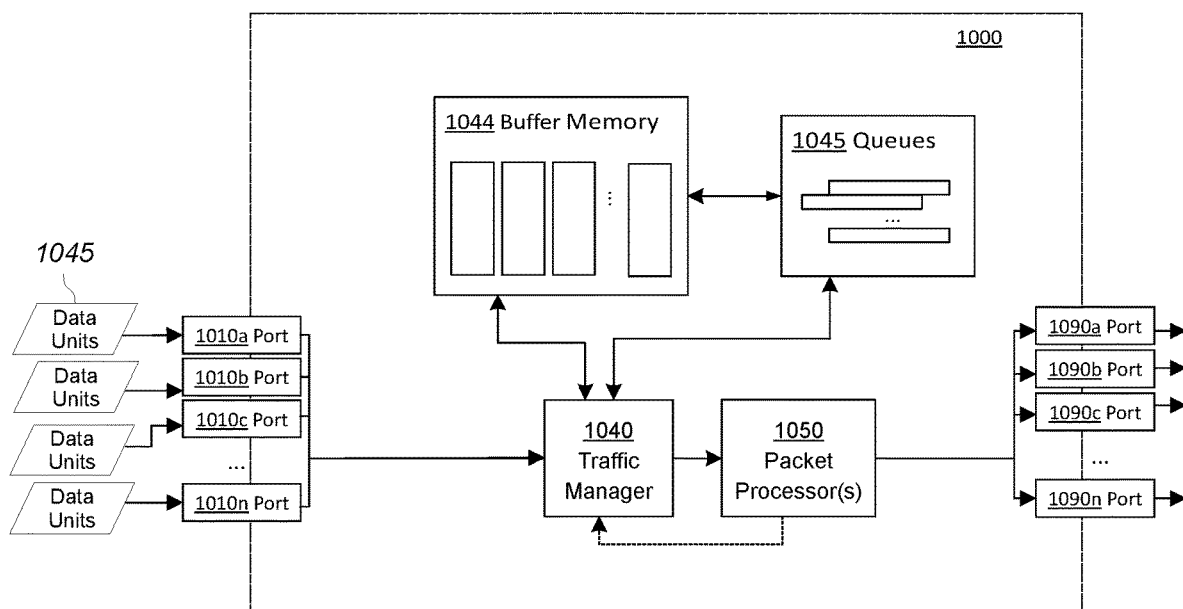
FIG. 10 is an illustrative view of various aspects of an example network device in which techniques described herein may be practiced.

FIG. 10 is an illustrative view of various aspects of an example network device 1000 in which techniques described herein may be practiced, according to an embodiment. Network device 1000 is a computing device comprising any combination of hardware and software configured to implement the various logical components described herein, including components 1010-1090. For example, the apparatus may be a single networking computing device, such as a router or switch, in which some or all of the components 1010-1090 described herein are implemented using application-specific integrated circuits (ASICs) or field programmable gate arrays (FPGAs). As another example, an implementing apparatus may include one or more memories storing instructions for implementing various components described herein, one or more hardware processors configured to execute the instructions stored in the one or more memories, and various data repositories in the one or more memories for storing data structures utilized and manipulated by various components 1010-1090.

Device 1000 is generally configured to receive and forward data units 1005 to other devices in a network, such as network 900, by means of a series of operations performed at various components within the device 1000. Note that certain nodes 910 in a system such as network 900 may each be or include a separate network device 1000. In an embodiment, a node 910 may include more than one device 1000. In an embodiment, device 1000 may itself be one of a number of components within a node 910. For instance, network device 1000 may be an integrated circuit, or "chip," dedicated to performing switching and/or routing functions within a network switch or router. The network switch or router may further comprise one or more central processor units, storage units, memories, physical interfaces, LED displays, or other components external to the chip, some or all of which may communicate with the chip.

A non-limiting example flow of a data unit 1005 through various subcomponents of the switching logic of device 1000 is as follows. After being received via a port 1010, a data unit 1005 may be buffered by an arbiter (not depicted) until the data unit 1005 can be processed by an ingress packet processor 1050, and then delivered to an interconnect (not depicted). From the interconnect, the data unit 1005 may be forwarded to a traffic manager 1040. The traffic manager 1040 may store the data unit 1005 in a buffer 1044 and assign the data unit 1005 to a queue 1045. The traffic manager 1040 manages the flow of the data unit 1005 through the queue 1045 until the data unit 1005 is released to an egress packet processor 1050. Depending on the processing, the traffic manager 1040 may then assign the data unit 1005 to another queue so that it may be processed by yet another egress processor 1050, or the egress packet processor 1050 may send the data unit 1005 to an egress arbiter (not depicted) from which the data unit 1005 is finally forwarded out another port 1090. Of course, depending on the embodiment, the switching logic may omit some of these subcomponents and/or include other subcomponents in varying arrangements.

Example components of a device 1000 are now described in further detail.

5.3. Ports

Network device 1000 includes ports 1010/1090, by which the packet-handling logic is coupled to various network interfaces that receive and transmit data units 1005. Ports 1010, including ports 1010*a-n*, are inbound ("ingress") ports by which data units 1005 are received over a network, such as network 900. Ports 1090, including ports 1090*a-n*, are outbound ("egress") ports by which at least some of the data units 1005 are sent out to other destinations within the network, after having been processed by the network device 1000.

Data units 1005 may be of any suitable PDU type, such as packets, cells, frames, etc. In an embodiment, data units 1005 are packets. However, the individual atomic data units upon which the depicted components operate may actually be subunits of the data units 1005. For example, at the port level, data units 1005 may be received, acted upon, and even transmitted as cells or other TDUs. These TDUs may be logically linked together as the data units 1005 (e.g. PDUs) to which they respectively belong for purposes of determining how to handle the cells or frames. However, the subunits may not actually be assembled into data units 1005 within device 1000, particularly if the subunits are being forwarded to another destination through device 1000.

Ports 1010/1090 are depicted as separate ports for illustrative purposes, but may actually correspond to the same physical interface hardware on the network device 1010. That is, a network device 1000 may both receive data units 1005 and send data units 1005 over a single physical interface, and the single physical interface may thus be logically coupled to both an ingress port 1010 and egress port 1090. Nonetheless, for various functional purposes, certain logic of the network device 1000 may view a single physical interface as a separate ingress port 1010 and egress port 1090. Moreover, for various functional purposes, certain logic of the network device 1000 may subdivide a single physical interface into multiple ingress ports 1010 or egress ports 1090, or aggregate multiple physical interfaces into a single ingress port 1010 or egress port 1090. Hence, in various embodiments, ports 1010 and 1090 should be understood as distinct logical constructs that can be mapped to physical interfaces rather than simply as distinct physical constructs.

In some embodiments, the physical interfaces to which the ports 1010/1090 of a device 1000 are coupled may include various interface components from a MAC layer and/or Physical layer, including one or more transceivers, Serializer/Deserializer ("SerDes") blocks, interface controllers, and/or other suitable components, by which device 1000 receives, decodes, descrambles, deserializes, encodes, scrambles, serializes, sends, and/or otherwise processes data units on their way in or out of ports 1010/1090.

5.4. Packet Processors

A device 1000 comprises one or more packet processing components 1050. These packet processors 1050 may be any suitable combination of fixed circuitry and/or software-based logic, such as specific logic components implemented by one or more Field Programmable Gate Arrays (FPGAs) or Application-Specific Integrated Circuits (ASICs), or a general-purpose processor executing software instructions.

Different packet processors 1050 may be configured to perform different packet processing tasks. These tasks may include, for example, identifying paths along which to forward data units 1005, forwarding data units 1005 to egress ports 1090, implementing flow control and/or other policies, manipulating packets, performing statistical or debugging operations, and so forth. A device 1000 may comprise any number of packet processors 1050 configured to perform any number of processing tasks.

In an embodiment, the packet processors 1050 within a device 1000 may be arranged such that the output of one packet processor 1050 may, eventually, be inputted into another packet processor 1050, in such a manner as to pass data units 1005 from certain packet processor(s) 1050 to other packet processor(s) 1050 in a sequence of stages, until finally disposing of the data units 1005 (e.g. by sending the data units 1005 out an egress port 1090, "dropping" the data units 1005, etc.). The exact set and/or sequence of packet processors 1050 that process a given data unit 1005 may vary, in some embodiments, depending on attributes of the data unit 1005 and/or the state of the device 1000. Any number of packet processors 1050 may be chained together in this manner.

Based on decisions made while processing a data unit 1005, a packet processor 1050 may, in some embodiments, and/or for certain processing tasks, manipulate a data unit 1005 directly. For instance, the packet processor 1050 may add, delete, or modify information in a data unit header or payload. In other embodiments, and/or for other processing tasks, a packet processor 1050 may generate control information that accompanies the data unit 1005, or is merged with the data unit 1005, as the data unit 1005 continues through the device 1000. This control information may then be utilized by other components of the device 1000 to implement decisions made by the packet processor 1050.

In an embodiment, a packet processor 1050 need not necessarily process an entire data unit 1005, but may rather only receive and process a subunit of a data unit 1005, such as a TDU comprising header information for the data unit.

For instance, if the data unit 1005 is a packet comprising multiple cells, the first cell, or a first subset of cells, might be forwarded to a packet processor 1050, while the remaining cells of the packet (and potentially the first cell(s) as well) are forwarded in parallel to a merger component where they await results of the processing.

INGRESS AND EGRESS PROCESSORS

In an embodiment, a packet processor may be generally classified as an ingress packet processor 1050 or an egress packet processor 1050. Generally, an ingress processor 1050 resolves destinations for a traffic manager 1040 to determine which ports 1090 and/or queues 1045 a data unit 1005 should depart from. There may be any number of ingress processors 1050, including just a single ingress processor 1050.

In an embodiment, an ingress processor 1050 performs certain intake tasks on data units 1005 as they arrive. These intake tasks may include, for instance, and without limitation, parsing data units 1005, performing routing related lookup operations, categorically blocking data units 1005 with certain attributes and/or when the device 1000 is in a certain state, duplicating certain types of data units 1005, making initial categorizations of data units 1005, and so forth. Once the appropriate intake task(s) have been performed, the data units 1005 are forwarded to an appropriate traffic manager 1040, to which the ingress processor 1050 may be coupled directly or via various other components, such as an interconnect component.

The egress packet processor(s) 1050 of a device 1000, by contrast, may be configured to perform non-intake tasks necessary to implement the switching logic of the device 1000. These tasks may include, for example, tasks such as identifying paths along which to forward the data units 1005, implementing flow control and/or other policies, manipulating data units, performing statistical or debugging operations, and so forth. In an embodiment, there may be different egress packet processors(s) 1050 assigned to different flows or other categories of traffic, such that not all data units 1005 will be processed by the same egress packet processor 1050.

In an embodiment, each egress processor 1050 is coupled to a different group of egress ports 1090 to which they may send data units 1005 processed by the egress processor 1050. In an embodiment, access to a group of ports 1090 may be regulated via an egress arbiter coupled to the egress packet processor 1050. In some embodiments, an egress processor 1050 may also or instead be coupled to other potential destinations, such as an internal central processing unit, a storage subsystem, or a traffic manager 1040.

5.5. Buffers

Since not all data units 1005 received by the device 1000 can be processed by the packet processor(s) 1050 at the same time, various components of device 1000 may temporarily store data units 1005 in one or more buffers 1044 while the data units 1005 are waiting to be processed. For example, a certain packet processor 1050 may only be capable of processing a certain number of data units 1005, or portions of data units 1005, in a given clock cycle, meaning that other data units 1005, or portions of data units 1005, destined for the packet processor 1050 must either be ignored (e.g., dropped) or stored. At any given time, a large number of data units 1005 may be stored in the buffers 1044 of the device 1000, depending on network traffic conditions.

A device 1000 may include a variety of buffers 1044, each utilized for varying purposes and/or components. Generally, a data unit 1005 awaiting processing by a component is held in a buffer 1044 associated with that component until the data unit 1005 is "released" to the component for processing. For example, a traffic manager 1040 will typically have a relatively large buffer 1044, referred to as an egress buffer, in which it buffers data units 1005 prior to releasing those data units 1050 to an egress packet processor 1050.

A buffer 1044 may be implemented using a single physical memory unit (e.g. SRAM, DRAM, etc.), a designated portion of a memory unit, or a collection of memory units, depending on an embodiment. The buffer 1044 is divided into addressable units, or entries, that store SDUs, one or more of which form a TDU, as explained elsewhere. Each TDU stored in a buffer 1044 belongs to a PDU. However, the data for the SDUs and/or TDUs that belong to a PDU may not necessarily be stored adjacent to each other. If one wishes to reconstruct a PDU based on the buffered SDUs, one might be unable to do so using the buffer memory alone. Therefore, in an embodiment, a buffer 1044 may further store or be associated with linking data that indicates which SDUs belong to a given TDU and/or which TDUs belong to a given PDU, also referred to as intra-packet link data.

For each PDU, buffer 1044 may further store or be associated with various PDU metadata. The PDU metadata may include any suitable information about a PDU, such as a PDU identifier, location(s) of linking data for the PDU (e.g. the address(es) of intra-packet entr(ies) at which the linked list(s) for the PDU start), a count of TDUs in the PDU, source information, destination information, control information, timestamps, statistics, an assigned queue, flow control information, and so forth.

5.6. Queues

In an embodiment, to manage the order in which data units 1005 are processed from buffers 1044, various components of a device 1000 may implement queueing logic. For example, the flow of data units 1005 through the egress buffers 1044 of traffic manager 1040 may be managed using egress queues while the flow of data units 1005 through the buffers of an ingress arbiter might be managed using ingress queues.

A queue 1045 is a set of nodes arranged in some order by metadata describing the queue 1045. The queue 1045 includes a head node, or head, which is typically the next node to be processed, and a tail node, or tail, which is typically the node most recently added to the queue. A node will typically progress from the tail to the head over time as other nodes are processed and removed from the queue.

In the case of queue 1045, the nodes are data unit 1005, or the buffer locations(s) at which the data unit 1005 begins. A data unit 1005 that has been added to a queue 1045 is said to be "linked" to that queue 1045. A data unit 1005 may belong to one or more queues 1045.

In many embodiments, the sequence in which the queue 1045 arranges its constituent data units 1005 generally corresponds to the order in which the data units 1005 or data unit portions in the queue 1045 will be released and processed. Such queues 1045 are known as first-in-first-out ("FIFO") queues, though in other embodiments other types of queues may be utilized. In some embodiments, the number of data units 1005 or data unit portions assigned to a given queue 1045 at a given time may be limited, either globally or on a per-queue basis, and this limit may change over time.

In an embodiment, queues 1045 are implemented using a linking memory referred to an "inter-packet" link memory, which is separate from the associated buffer memory 1044. Each entry in the link memory is said to be a node in the queue. Each link entry points comprises a data pointer, which, when the link entry is occupied, points to a memory location in the buffer memory 1044 at which a corresponding data unit (or at least the start of the data unit) is found (e.g. a buffer entry, a first entry for the data unit in an intra-packet link memory, etc.). Each entry in the link memory further may further comprises a link pointer to another link entry, which corresponds to the next node in the queue. Of course, in other embodiments, other types of linking memories and/or other structures may instead be utilized instead to represent the queue.

5.7. Traffic Management

According to an embodiment, a device 1000 further includes one or more traffic managers 1040 configured to control the flow of data units 1005 to one or more packet processor(s) 1050. A traffic manager 1040 may receive data units 1005 directly from a port 1010, from an ingress processor 1050, and/or other suitable components of device 1000. In an embodiment, the traffic manager 1040 is configured to receive up to one TDU from each possible source (e.g. each port 1010) each clock cycle of the traffic manager 1040.

Traffic manager 1040 may include or be coupled to buffers 1044 for buffering data units 1005 prior to sending those data units 1005 to their respective processor(s) 1050. A buffer manager within the traffic manager 1040 may temporarily store data units 1005 in buffers 1044 as they await processing by processor(s) 1050. A data unit 1005 or data unit portion in a buffer 1044 may eventually be "released" to one or more processor(s) 1050 for processing, by reading the data unit 1005 from the buffer 1044 and sending the data unit 1005 to the processor(s) 1050. In an embodiment, traffic manager 1040 may release up to a certain number of data units 1005 from buffers 1044 to processors 1050 each clock cycle.

Beyond managing the use of buffers 1044 to store data units 1005 (or copies thereof), a traffic manager 1040 may include queue management logic configured to assign data units 1005 to queues 1045 and manage the flow of data units 1005 through queues 1045. The traffic manager 1040 may, for instance, "enqueue" a PDU that has been fully buffered by identifying a specific queue 1045 to assign the PDU to, and then linking a PDU identifier or other PDU metadata to the assigned queue. The traffic manager 1040 may further determine when to release—also referred to as dequeuing—data units 1005 from queues 1045 by sending instructions to the buffer manager 1044 to read/release the data units 1005 and then providing the data read from the buffer 1044 to specific packet processor(s) 1050.

In an embodiment, different queues 1045 may exist for different sources or destinations. For example, each port 1010 and/or port 1090 may have its own set of queues 1045. The queue 1045 to which an incoming data unit 1005 is assigned and linked may, for instance, be selected based on forwarding information indicating which port 1090 the data unit 1005 should depart from. In an embodiment, a different egress processor 1050 may be associated with each different set of one or more queues 1045. In an embodiment, the current processing context of the data unit 1005 may be used to select which queue 1045 a data unit 1005 should be assigned to.

In an embodiment, there may also or instead be different queues 1045 for different flows or sets of flows. That is, each identifiable traffic flow or group of traffic flows is assigned its own set of queues 1045 to which its data units 1005 are respectively assigned. In an embodiment, different queues 1045 may correspond to different classes of traffic or quality-of-service (QOS) levels. Different queues 1045 may also or instead exist for any other suitable distinguishing properties of the data units 1005, such as source address, destination address, packet type, and so forth.

Though only one packet processor 1050 and traffic manager 1040 are depicted, a device 1000 may comprise any number of packet processors 1050 and traffic managers 1040. For instance, different sets of ports 1010 and/or ports 1090 may have their own traffic manager 1040 and packet processors 1050. As another example, in an embodiment, the traffic manager 1040 may be duplicated for some or all of the stages of processing a data unit. For example, system 1000 may include a traffic manager 1040 and egress packet processor 1050 for an egress stage performed upon the data unit 1005 exiting the system 1000, and/or a traffic manager 1040 and packet processor 1050 for any number of intermediate stages. The data unit 1005 may thus pass through any number of traffic managers 1040 and/or packet processors 1050 prior to exiting the system 1000. In other embodiments, only a single traffic manager 1040 is needed. If intermediate processing is needed, flow of a data unit 1005 may loop back to the traffic manager 1040 for buffering and/or queuing after each stage of intermediate processing.

In an embodiment, a traffic manager 1040 is coupled to the output of an ingress packet processor(s) 1050, such that data units 1005 (or portions thereof) are assigned to buffers 1044 only upon being initially processed by an ingress packet processor 1050. Once in an egress buffer 1044, a data unit 1005 (or portion thereof) may be "released" to one or more egress packet processor(s) 1050 for processing.

In the course of processing a data unit 1005, a device 1000 may replicate a data unit 1005 one or more times for purposes such as, without limitation, multicasting, mirroring, debugging, and so forth. For example, a single data unit 1005 may be replicated to multiple egress queues 1045. For instance, a data unit 1005 may be linked to separate queues 1045 for each of ports 1, 3, and 10. As another example, a data unit 1005 may be replicated a number of times after it reaches the head of a queue 1045 (e.g. for different egress processors 1050). Hence, though certain techniques described herein may refer to the original data unit 1005 that was received by the device 1000, it will be understood that those techniques will equally apply to copies of the data unit 1005 that have been generated for various purposes. A copy of a data unit 1005 may be partial or complete. Moreover, there may be an actual physical copy of the data unit 1005 in buffers 1044, or a single copy of the data unit 1005 may be linked from a single buffer location to multiple queues 1045 at the same time.

5.8. Forwarding Logic

The logic by which a device 1000 determines how to handle a data unit 1005—such as where and whether to send a data unit 1005, whether to perform additional processing on a data unit 1005, etc. —is referred to as the forwarding logic of the device 1000. This forwarding logic is collectively implemented by a variety of the components of the device 1000, such as described above. For example, an ingress packet processor 1050 may be responsible for resolving the destination of a data unit 1005 and determining the set of actions/edits to perform on the data unit 1005, and an egress packet processor 1050 may perform the edits. Also, there may be embodiments where the ingress packet processor 1050 performs edits as well.

The forwarding logic may be hard-coded and/or configurable, depending on the embodiment. For example, the forwarding logic of a device 1000, or portions thereof, may, in some instances, be at least partially hard-coded into one or more ingress processors 1050 and/or egress processors 1050. As another example, the forwarding logic, or elements thereof, may also be configurable, in that the logic changes over time in response to analyses of state information collected from, or instructions received from, the various components of the device 1000 and/or other nodes in the network in which the device 1000 is located.

In an embodiment, a device 1000 will typically store in its memories one or more forwarding tables (or equivalent structures) that map certain data unit attributes or characteristics to actions to be taken with respect to data units 1005 having those attributes or characteristics, such as sending a data unit 1005 to a selected path, or processing the data unit 1005 using a specified internal component. For instance, such attributes or characteristics may include a Quality-of-Service level specified by the data unit 1005 or associated with another characteristic of the data unit 1005, a flow control group, an ingress port 1010 through which the data unit 1005 was received, a tag or label in a packet's header, a source address, a destination address, a packet type, or any other suitable distinguishing property. The forwarding logic may, for example, read such a table, determine one or more ports 1090 to send a data unit 1005 to based on the table, and add or associate the data unit 1005 with information that indicates to downstream logic to send the data unit 1005 along a path that includes a specific traffic manager 1040 and/or egress processor 1050 that is coupled to the one or more ports 1090.

According to an embodiment, the forwarding tables describe groups of one or more addresses, such as subnets of IPv4 or IPv6 addresses. Each address is an address of a network device on a network, though a network device may have more than one address. Each group is associated with a potentially different set of one or more actions to execute with respect to data units that resolve to (e.g. are directed to) an address within the group. Any suitable set of one or more actions may be associated with a group of addresses, including without limitation, forwarding a message to a specified "next hop," duplicating the message, changing the destination of the message, dropping the message, performing debugging or statistical operations, applying a quality of service policy or flow control policy, and so forth.

For illustrative purposes, these tables are described as "forwarding tables," though it will be recognized that the extent of the action(s) described by the tables may be much greater than simply where to forward the message. For example, in an embodiment, a table may be a basic forwarding table that simply specifies a next hop for each group. In other embodiments, a table may describe one or more complex policies for each group. Moreover, there may be different types of tables for different purposes. For instance, one table may be a basic forwarding table that is compared to the destination address of each packet, while another table may specify policies to apply to packets upon ingress based on their destination (or source) group, and so forth.

In an embodiment, forwarding logic may read port state data for ports 1010/1090. Port state data may include, for instance, flow control state information describing various traffic flows and associated traffic flow control rules or policies, link status information indicating links that are up or down, port utilization information indicating how ports are being utilized (e.g. utilization percentages, utilization states, etc.). Forwarding logic may be configured to implement the associated rules or policies associated with the flow(s) to which a given packet belongs.

As data units 1005 are routed through different nodes in a network, the nodes may, on occasion, discard, fail to send, or fail to receive certain data units 1005, thus resulting in the data units 1005 failing to reach their intended destination. The act of discarding of a data unit 1005, or failing to deliver a data unit 1005, is typically referred to as "dropping" the data unit. Instances of dropping a data unit 1005, referred to herein as "drops" or "packet loss," may occur for a variety of reasons, such as resource limitations, errors, or deliberate policies. Different components of a device 1000 may make the decision to drop a data unit 1005 for various reasons. For instance, a traffic manager 1040 may determine to drop a data unit 1005 because, among other reasons, buffers 1044 are overutilized, a queue 1045 is over a certain size, and/or a data unit 1005 has a certain characteristic.

5.9. Multi-Pipeline Architecture

Figure 11:
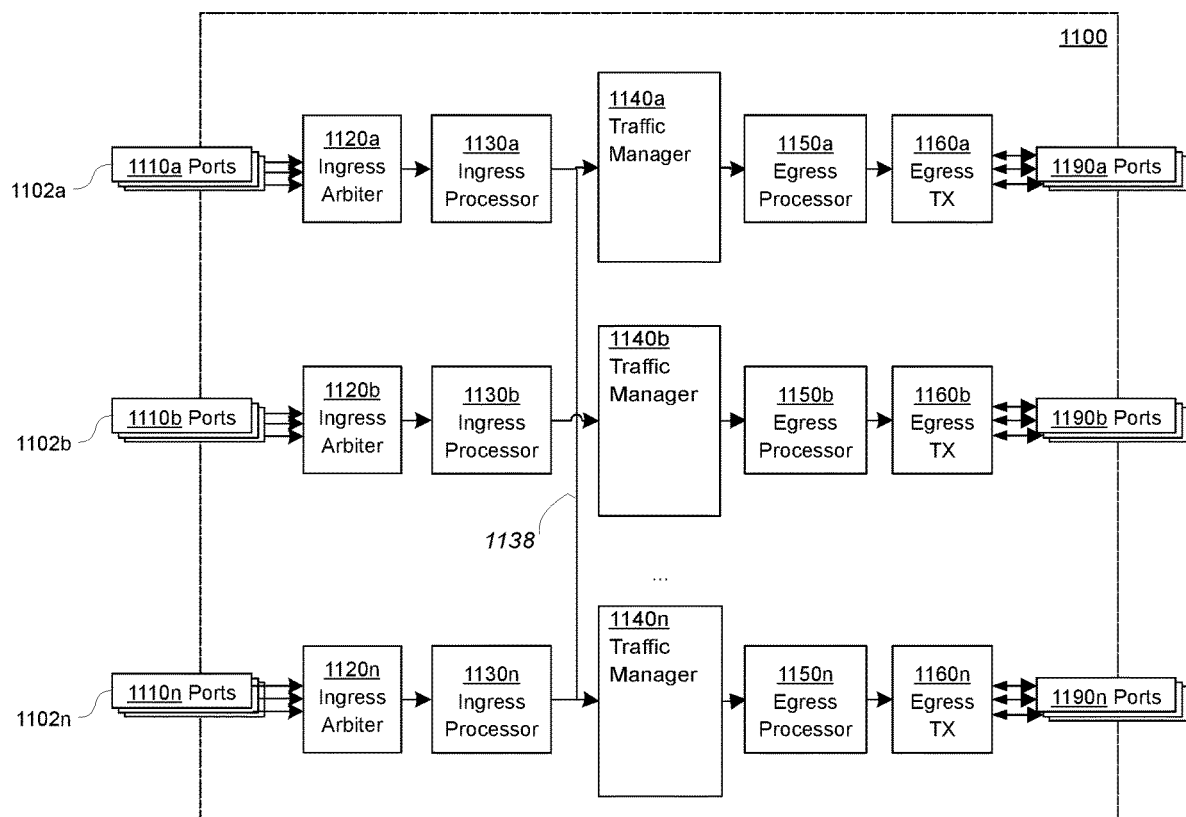
FIG. 11 illustrates an example of a network device with multiple packet processing pipelines.

In an embodiment, a network device may include multiple pipelines of data unit processing components such as those described above. FIG. 11 illustrates an example of one such network device with multiple packet processing pipelines, according to an embodiment. Network device 1100 includes a plurality of ingress ports 1110 and egress ports 1190, similar to the ingress ports 1010 and egress ports 1090 of device 1000. The ingress ports 1110 are divided into port groups 1110a-n, and each group of ports 1110 feeds data units to a different pipeline 1102 of processing components. There may be any number of groups of ports 1110, and hence any number of corresponding pipelines 1102.

Each pipeline includes an ingress arbiter 1120. Each ingress arbiter 1120 is coupled to a corresponding group of ingress ports 1110, and receives data units from those ports 1110. In some respects, each ingress arbiter 1120 may be viewed as an ingress version of traffic manager 1040. An ingress arbiter 1120 is responsible for determining when data units are sent to downstream components, and in particular to an ingress packet processor 1130 that is coupled to the ingress arbiter 1120 within a corresponding pipeline 1102. An ingress arbiter 1120 may or may not include its own buffer memory in which it buffers data unit that await processing, depending on the embodiment.

In an embodiment, the data units sent by the ingress arbiter 1120 are actually subunits, such as cells, frames, segments, or other TDUs, of larger parent data units, such as packets or other PDUs. The ingress arbiter 1120 may, in an embodiment, divide a larger data unit (or ensure that the larger data unit is divided) into these subunits prior to transmitting the data units to the corresponding ingress packet processor 1130. In an embodiment, a packet or other PDU may arrive at the ingress arbiter 1120 as a set of TDUs. For convenience, examples are given herein where the TDU is a cell, and the PDU is a packet, but it will be appreciated that the cell may in fact be any type of subunit, and the packet may in fact be any larger data unit that comprises those subunits.

Each pipeline 1102 further includes an ingress packet processor 1130 to which its ingress arbiter 1120 eventually sends these data units. Each ingress packet processor 1130, meanwhile, functions in similar manner as an ingress packet processor 1050 described above. In particular, an ingress packet processor 1130 performs forwarding tasks such as resolving the data unit destination, adding or removing headers, and so forth. For instance, the ingress packet processor 1130 may be responsible for generating control information that instructs downstream components of the pipelines 1102 on how to handle the data unit, and this control information may either be inserted into the data unit, or be conveyed along with the data unit as sideband information.

Each pipeline 1102 further includes an egress traffic manager 1140, which functions in similar manner to the traffic manager 1040. A common interconnect 1138 is coupled to each ingress packet processor 1130 on one end and each egress traffic manager 1140 on the other. The interconnect 1138 conveys data units to traffic manager(s) 1140 indicated by the ingress packet processors 1130 (e.g. based on the control information), thereby allowing data units to "switch" pipelines 1102 should their destination(s) include a port 1190 that is not on the same pipeline 1102 as the ingress port 1110 through which the data unit was received. Ingress packet processors 1130 may be coupled to the interconnect 1138 directly, or indirectly via other components such as a merger unit (e.g. that merges a control portion of the data unit processed by the packet processor 1130 with a data portion of the data unit that bypasses the packet processor 1130).

A pipeline's egress traffic manager 1140 then regulates the flow of data units to the pipeline's egress packet processor 1150, in similar manner as described with respect to traffic manager 1040. The egress packet processor 1150 processes data units in similar manner as described with respect egress packet processors 1050. The egress packet processors then forward the processed data units to the pipeline's egress port transmit unit 1160, which is responsible for transmission of data units out a set of one or more egress ports 1190 belonging to the pipeline 1102. The set of egress ports 1190 for a pipeline corresponds to the pipeline's ingress ports 1110.

In yet other embodiments, an egress traffic manager 1140 and/or other components may be shared between such pipelines.

5.10. Miscellaneous

Devices 1000 and 1100 illustrate only several of many possible arrangements of components in a network device configured to provide the functionality described herein. Other arrangements may include fewer, additional, or different components, and the division of work between the components may vary depending on the arrangement. Moreover, in an embodiment, the techniques described herein may be utilized in a variety of computing contexts other than within a network 900.

For simplification, the traffic managers, packet processors, and other components are on occasion described herein as acting upon or with respect to a data unit, when in fact only a portion of the data unit may be sent to or otherwise available to the component. For instance, a packet processor may be said to process a data unit, when in fact only the data unit control portion is available to the packet processor. In such contexts, it will be understood that the information about the data unit that is actually available to the component is a representation of the data unit to that component. Any actions described herein as having been taken by the component on or with respect to the data unit may occur with respect to the representation of the data unit, and not necessarily the complete data unit.

It will be appreciated that the actual physical representation of a data unit may change as a result of the processes described herein. For instance, a data unit may be converted from a physical representation at a particular location in one memory to a signal-based representation, and back to a physical representation at a different location in a potentially different memory, as it is moved from one component to another within a network device or even between network devices. Such movement may technically involve deleting, converting, and/or copying some or all of the data unit any number of times. For simplification, however, the data unit is logically said to remain the same data unit as it moves through the device, even if the physical representation of the data unit changes. Similarly, the contents and/or structure of a data unit may change as it is processed, such as by adding or deleting header information, adjusting cell boundaries, or even modifying payload data. A modified data unit is nonetheless still said to be the same data unit, even after altering its contents and/or structure.

6.0. Implementation Mechanism—Hardware Overview

According to one embodiment, the techniques described herein are implemented by one or more special-purpose computing devices. The special-purpose computing devices may be desktop computer systems, portable computer systems, handheld devices, networking devices, or any other device that incorporates hard-wired and/or program logic to implement the techniques. The special-purpose computing devices may be hard-wired to perform the techniques, or may include digital electronic devices such as one or more application-specific integrated circuits (ASICs) or field programmable gate arrays (FPGAs) that are persistently programmed to perform the techniques. Such special-purpose computing devices may also combine custom hard-wired logic, ASICs, FPGAs, or other circuitry with custom programming to accomplish the techniques.

Though certain foregoing techniques are described with respect to a hardware implementation, which provides a number of advantages in certain embodiments, it will also be recognized that, in other embodiments, the foregoing techniques may still provide certain advantages when performed partially or wholly in software. Accordingly, in such an embodiment, a suitable implementing apparatus comprises a general-purpose hardware processor and is configured to perform any of the foregoing methods by executing program instructions in firmware, memory, other storage, or a combination thereof.

Figure 12:
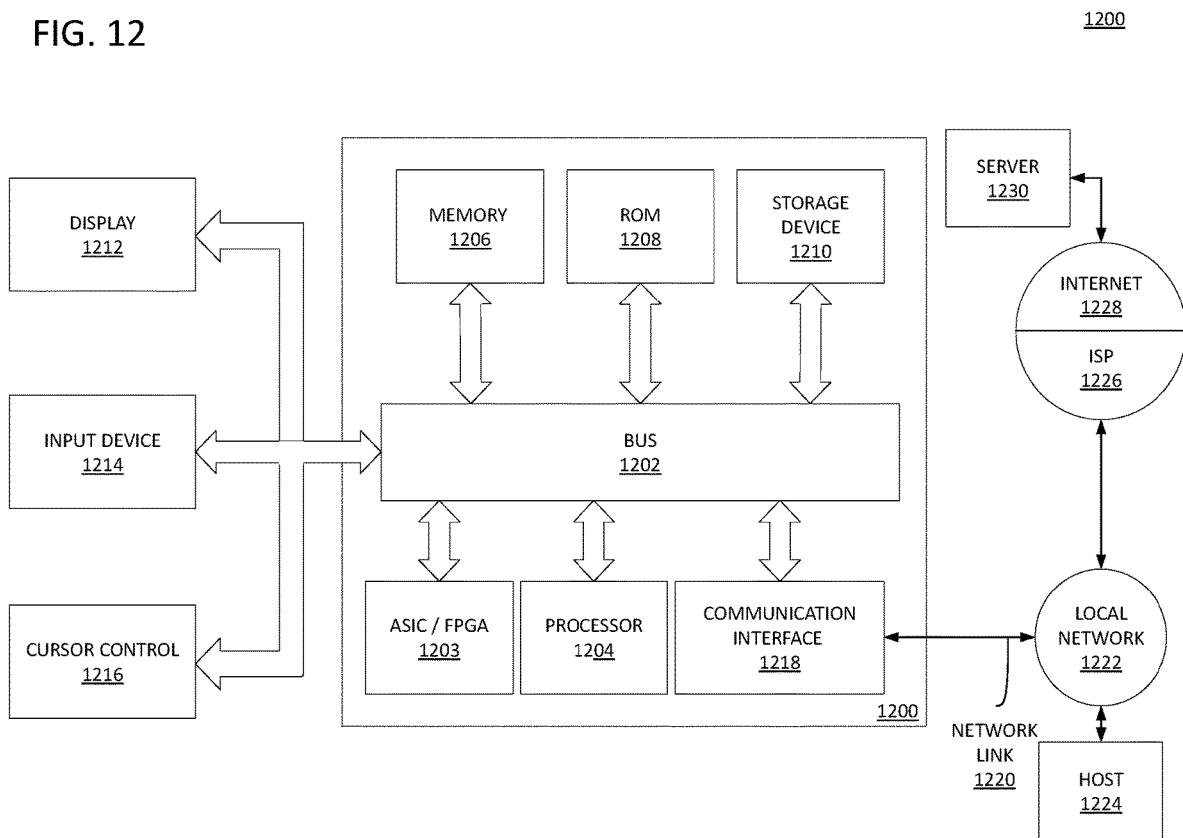
FIG. 12 is a block diagram that illustrates an example computer system that may be utilized in implementing the above-described techniques.

FIG. 12 is a block diagram that illustrates an example computer system 1200 that may be utilized in implementing the above-described techniques, according to an embodiment. Computer system 1200 may be, for example, a desktop computing device, laptop computing device, tablet, smartphone, server appliance, computing mainframe, multimedia device, handheld device, networking apparatus, or any other suitable device. In an embodiment, FIG. 12 constitutes a different view of the devices and systems described in previous sections.

Computer system 1200 may include one or more ASICs, FPGAs, or other specialized circuitry 1203 for implementing program logic as described herein. For example, circuitry 1203 may include fixed and/or configurable hardware logic blocks for implementing some or all of the described techniques, input/output (I/O) blocks, hardware registers or other embedded memory resources such as random-access memory (RAM) for storing various data, and so forth. The logic blocks may include, for example, arrangements of logic gates, flip-flops, multiplexers, and so forth, configured to generate an output signals based on logic operations performed on input signals.

Additionally, and/or instead, computer system 1200 may include one or more hardware processors 1204 configured to execute software-based instructions. Computer system 1200 may also include one or more busses 1202 or other communication mechanism for communicating information. Busses 1202 may include various internal and/or external components, including, without limitation, internal processor or memory busses, a Serial ATA bus, a PCI Express bus, a Universal Serial Bus, a HyperTransport bus, an InfiniBand bus, and/or any other suitable wired or wireless communication channel.

Computer system 1200 also includes one or more memories 1206, such as a RAM, hardware registers, or other dynamic or volatile storage device for storing data units to be processed by the one or more ASICs, FPGAs, or other specialized circuitry 1203. Memory 1206 may also or instead be used for storing information and instructions to be executed by processor 1204. Memory 1206 may be directly connected or embedded within circuitry 1203 or a processor 1204. Or, memory 1206 may be coupled to and accessed via bus 1202. Memory 1206 also may be used for storing temporary variables, data units describing rules or policies, or other intermediate information during execution of program logic or instructions.

Computer system 1200 further includes one or more read only memories (ROM) 1208 or other static storage devices coupled to bus 1202 for storing static information and instructions for processor 1204. One or more storage devices 1210, such as a solid-state drive (SSD), magnetic disk, optical disk, or other suitable non-volatile storage device, may optionally be provided and coupled to bus 1202 for storing information and instructions.

A computer system 1200 may also include, in an embodiment, one or more communication interfaces 1218 coupled to bus 1202. A communication interface 1218 provides a data communication coupling, typically two-way, to a network link 1220 that is connected to a local network 1222. For example, a communication interface 1218 may be an integrated services digital network (ISDN) card, cable modem, satellite modem, or a modem to provide a data communication connection to a corresponding type of telephone line. As another example, the one or more communication interfaces 1218 may include a local area network (LAN) card to provide a data communication connection to a compatible LAN. As yet another example, the one or more communication interfaces 1218 may include a wireless network interface controller, such as an 802.11-based controller, Bluetooth controller, Long Term Evolution (LTE) modem, and/or other types of wireless interfaces. In any such implementation, communication interface 1218 sends and receives electrical, electromagnetic, or optical signals that carry digital data streams representing various types of information.

Network link 1220 typically provides data communication through one or more networks to other data devices. For example, network link 1220 may provide a connection through local network 1222 to a host computer 1224 or to data equipment operated by a Service Provider 1226. Service Provider 1226, which may for example be an Internet Service Provider (ISP), in turn provides data communication services through a wide area network, such as the worldwide packet data communication network now commonly referred to as the "Internet" 1228. Local network 1222 and Internet 1228 both use electrical, electromagnetic or optical signals that carry digital data streams. The signals through the various networks and the signals on network link 1220 and through communication interface 1218, which carry the digital data to and from computer system 1200, are example forms of transmission media.

In an embodiment, computer system 1200 may send and receive data units through the network(s), network link 1220, and communication interface 1218. In some embodiments, this data may be data units that the computer system 1200 has been asked to process and, if necessary, redirect to other computer systems via a suitable network link 1220. In other embodiments, this data may be instructions for implementing various processes related to the described techniques. For instance, in the Internet example, a server 1230 might transmit a requested code for an application program through Internet 1228, ISP 1226, local network 1222 and communication interface 1218. The received code may be executed by processor 1204 as it is received, and/or stored in storage device 1210, or other non-volatile storage for later execution. As another example, information received via a network link 1220 may be interpreted and/or processed by a software component of the computer system 1200, such as a web browser, application, or server, which in turn issues instructions based thereon to a processor 1204, possibly via an operating system and/or other intermediate layers of software components.

Computer system 1200 may optionally be coupled via bus 1202 to one or more displays 1212 for presenting information to a computer user. For instance, computer system 1200 may be connected via a High-Definition Multimedia Interface (HDMI) cable or other suitable cabling to a Liquid Crystal Display (LCD) monitor, and/or via a wireless connection such as peer-to-peer Wi-Fi Direct connection to a Light-Emitting Diode (LED) television. Other examples of suitable types of displays 1212 may include, without limitation, plasma display devices, projectors, cathode ray tube (CRT) monitors, electronic paper, virtual reality headsets, braille terminal, and/or any other suitable device for outputting information to a computer user. In an embodiment, any suitable type of output device, such as, for instance, an audio speaker or printer, may be utilized instead of a display 1212.

One or more input devices 1214 are optionally coupled to bus 1202 for communicating information and command selections to processor 1204. One example of an input device 1214 is a keyboard, including alphanumeric and other keys. Another type of user input device 1214 is cursor control 1216, such as a mouse, a trackball, or cursor direction keys for communicating direction information and command selections to processor 1204 and for controlling cursor movement on display 1212. This input device typically has two degrees of freedom in two axes, a first axis (e.g., x) and a second axis (e.g., y), that allows the device to specify positions in a plane. Yet other examples of suitable input devices 1214 include a touch-screen panel affixed to a display 1212, cameras, microphones, accelerometers, motion detectors, and/or other sensors. In an embodiment, a network-based input device 1214 may be utilized. In such an embodiment, user input and/or other information or commands may be relayed via routers and/or switches on a Local Area Network (LAN) or other suitable shared network, or via a peer-to-peer network, from the input device 1214 to a network link 1220 on the computer system 1200.

As discussed, computer system 1200 may implement techniques described herein using customized hard-wired logic, one or more ASICs or FPGAs 1203, firmware and/or program logic, which in combination with the computer system causes or programs computer system 1200 to be a special-purpose machine. According to one embodiment, however, the techniques herein are performed by computer system 1200 in response to processor 1204 executing one or more sequences of one or more instructions contained in main memory 1206. Such instructions may be read into main memory 1206 from another storage medium, such as storage device 1210. Execution of the sequences of instructions contained in main memory 1206 causes processor 1204 to perform the process steps described herein.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage device 1210. Volatile media includes dynamic memory, such as main memory 1206. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 1202. Transmission media may also take the form of acoustic or light waves, such as those generated during radio-wave and infra-red data communications.

Various forms of media may be involved in carrying one or more sequences of one or more instructions to processor 1204 for execution. For example, the instructions may initially be carried on a magnetic disk or solid-state drive of a remote computer. The remote computer can load the instructions into its dynamic memory and use a modem to send the instructions over a network, such as a cable network or cellular network, as modulated signals. A modem local to computer system 1200 may receive the data on the network and demodulate the signal to decode the transmitted instructions. Appropriate circuitry may then place the data on bus 1202. Bus 1202 carries the data to main memory 1206, from which processor 1204 retrieves and executes the instructions. The instructions received by main memory 1206 may optionally be stored on storage device 1210 either before or after execution by processor 1204.

7.0. Extensions and Alternatives

As used herein, the terms "first," "second," "certain," and "particular" are used as naming conventions to distinguish queries, plans, representations, steps, objects, devices, or other items from each other, so that these items may be referenced after they have been introduced. Unless otherwise specified herein, the use of these terms does not imply an ordering, timing, or any other characteristic of the referenced items.

In the drawings, the various components are depicted as being communicatively coupled to various other components by arrows. These arrows illustrate only certain examples of information flows between the components. Neither the direction of the arrows nor the lack of arrow lines between certain components should be interpreted as indicating the existence or absence of communication between the certain components themselves. Indeed, each component may feature a suitable communication interface by which the component may become communicatively coupled to other components as needed to accomplish any of the functions described herein.

In the foregoing specification, embodiments of the inventive subject matter have been described with reference to numerous specific details that may vary from implementation to implementation. Thus, the sole and exclusive indicator of what is the inventive subject matter, and is intended to be the inventive subject matter, is the set of claims that issue from this application, in the specific form in which such claims issue, including any subsequent correction. In this regard, although specific claim dependencies are set out in the claims of this application, it is to be noted that the features of the dependent claims of this application may be combined as appropriate with the features of other dependent claims and with the features of the independent claims of this application, and not merely according to the specific dependencies recited in the set of claims. Moreover, although separate embodiments are discussed herein, any combination of embodiments and/or partial embodiments discussed herein may be combined to form further embodiments.

Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A network apparatus comprising:
   a plurality of ports configured to send and/or receive data units over one or more networks;
   enqueue logic configured to enqueue the data units in queues, in which the data units await transmission to one or more downstream logic components, wherein each queue of the queues is assigned to one of the ports, the queue holding data units that are to be sent to or were received from the port assigned to the queue;
   dequeue logic configured to dequeue particular data units from the queues in response to instructions from a scheduler, wherein when instructed by the scheduler to dequeue a data unit associated with a particular port, selects a particular queue, of the queues, assigned to the particular port from which to dequeue a particular data unit at the head of the particular queue;
   a data unit transmitter configured to send the particular data units that have been dequeued by the dequeue logic to the one or more downstream logic components;
   the scheduler, configured to determine, at a given time, a given port of the ports to service, and send an instruction to the dequeue logic to dequeue data associated with the given port at the given time, the scheduler configured to service at least a first port of the ports no more frequently than at a service rate, the service rate indicates how frequently a port may be serviced in a clock cycle;
   a rate adjuster configured to, based on sizes of certain data units, of the data units, that are assigned to the first port, temporarily adjust the service rate from a first rate to a second rate.

2. The apparatus of claim 1, wherein the rate adjuster is configured to adjust the service rate from the first rate to the second rate responsive to a determination that at least two data units associated with the first port are both ready to be dequeued and are smaller than a particular size.

3. The apparatus of claim 2, wherein determining that at least two data units associated with the first port are smaller than the particular size comprises at least one of: determining that the at least two data units are, in combination, smaller than a maximum data unit size.

4. The apparatus of claim 1, wherein the rate adjuster is configured to adjust the service rate from the first rate to the second rate responsive to a determination that an average size of a plurality of the data units over a recent period of time is smaller than a particular size.

5. The apparatus of claim 1, wherein the first rate is a rate at which the first port must be serviced to ensure that a defined bandwidth of the first port is realized when the first port is transmitting maximum-size data units, wherein the second rate is greater than the first rate.

6. The apparatus of claim 1, wherein the rate adjuster is configured to adjust the service rate by at least causing the dequeue logic to dequeue at least two data units for the first port concurrently at a particular time.

7. The apparatus of claim 1,
wherein the rate adjuster is configured to adjust the service rate by at least causing the enqueue logic to link two or more data units together when enqueueing the two or more data units in a queue associated with the first port;
wherein the dequeue logic is configured to dequeue the two or more data units from the queue concurrently at a particular time in a manner that is transparent to the dequeue logic as a consequence of the linking.

8. The apparatus of claim 1, wherein the rate adjuster is configured to adjust the service rate by at least causing the dequeue logic to dequeue multiple data units for the first port at a same time, wherein the data unit transmitter is configured to send one data unit for the first port to the one or more downstream logic components at a time, wherein the data unit transmitter includes a port FIFO for the first port, the port FIFO configured to store at least one of the multiple data units for transmission to the one or more downstream logic components at a later time.

9. The apparatus of claim 8, wherein, when the port FIFO stores at least one data unit, the rate adjuster is configured to activate a pseudo-port for the first port in a port scheduling sequence for the scheduler, the first port and the pseudo-port separately selectable from the sequence at a frequency corresponding to the first rate, the first port thereby effectively serviced at the second rate.

10. The apparatus of claim 8, wherein, when the port FIFO stores at least one data unit, and the scheduler determines whether to service the first port or a corresponding pseudo-port in a given clock cycle, the scheduler is configured to instruct the transmission logic to transmit a next data unit in the port FIFO to the one or more downstream logic components instead of a newly dequeued data unit.

11. The apparatus of claim 1, wherein, when a particular data unit is an end-of-packet data unit and the rate adjuster detects another end-of-packet data unit at the head of another queue assigned to the particular port, or immediately following the particular data unit in the particular queue, the dequeue logic is configured to dequeue both the particular data unit and the another end-of-packet data unit at the same time.

12. The apparatus of claim 1, wherein the one or more downstream logic components being one or more traffic managers, one or more packet processors, or the plurality of ports.

13. A method comprising:
sending and/or receiving data units over one or more networks via a plurality of ports of a network apparatus;
enqueueing the data units in queues, in which the data units await transmission to one or more downstream logic components of the network apparatus, wherein each queue of the data unit queues is assigned to one of the ports, the queue holding data units that are to be sent to or were received from the port assigned to the queue;
dequeuing particular data units from the queues, the dequeuing including determining, at a given time, a given port of the ports to service, based at least on a constraint that a first port of the ports is serviced no more frequently than at a service rate, the service rate indicates how frequently a port may be serviced in a clock cycle, and dequeuing data associated with the given port at the given time, wherein when dequeuing data associated with a particular port, selecting a particular queue, of the queues, assigned to the particular port from which to dequeue a particular data unit at the head of the particular queue;
sending the particular data units that have been dequeued to the one or more downstream logic components;
based on sizes of certain data units, of the data units, that are assigned to the first port, temporarily adjusting the service rate from a first rate to a second rate.

14. The method of claim 13, wherein adjusting the service rate from the first rate to the second rate is responsive to a determination that at least two data units associated with the first port are both ready to be dequeued and are smaller than a particular size.

15. The method of claim 13, wherein the first rate is a rate at which the first port must be serviced to ensure that a defined bandwidth of the first port is realized when the first port is transmitting maximum-size data units, wherein the second rate is greater than the first rate.

16. The method of claim 13, wherein adjusting the service rate comprises dequeuing the at least two data units concurrently at a particular time.

17. The method of claim 13, wherein adjusting the service rate comprises dequeuing multiple data units for the first port at a same time, wherein only one data unit is sent for the first port to the one or more downstream logic components at a time, wherein the method further comprises:
storing at least one of the multiple data units in a port FIFO for the first port;
activating a pseudo-port for the first port in a port scheduling sequence when the port FIFO stores at least one data unit;
wherein determining the given port to service at the given time comprises selecting the given port using the port scheduling sequence, the first port and the pseudo-port separately selectable from the sequence at a frequency corresponding to the first rate, the first port thereby effectively serviced at the second rate; and
wherein when the port FIFO stores at least one data unit, upon determining to service the first port or a corresponding pseudo-port in a given clock cycle, transmitting a next data unit from the port FIFO to the one or more downstream logic components, instead of a newly dequeued data unit.

18. The method of claim 13, further comprising:
dequeuing both a particular data unit and another end-of-packet data unit at a same time when the particular data unit is an end-of-packet data unit and the another end-of-packet data unit is at the head of another queue assigned to the particular port, or immediately follows the particular data unit in the particular queue.

19. The method of claim 13, wherein the one or more downstream logic components is one or more traffic managers, one or more packet processors, or the plurality of ports.

20. The method of claim 13, wherein adjusting the service rate from the first rate to the second rate is responsive to a determination that an average size of a plurality of the data units over a recent period of time is smaller than a particular size.

* * * * *